United States Patent
Egami et al.

(10) Patent No.: US 7,327,234 B2
(45) Date of Patent: Feb. 5, 2008

(54) DRIVING ASSISTANCE METHOD AND SYSTEM WITH HAPTIC NOTIFICATION SEAT

(75) Inventors: Masahiro Egami, Yokosuka (JP); Shunsuke Hijikata, Kamakura (JP)

(73) Assignee: Nissan Motor Co., Ltd., Kanagawa-Ken (JP)

(*) Notice: Subject to any disclaimer, the term of this patent is extended or adjusted under 35 U.S.C. 154(b) by 140 days.

(21) Appl. No.: 11/047,577

(22) Filed: Feb. 2, 2005

(65) Prior Publication Data

US 2005/0174223 A1    Aug. 11, 2005

(30) Foreign Application Priority Data

Feb. 9, 2004  (JP) ............. P2004-032465

(51) Int. Cl.
B60R 25/10    (2006.01)
(52) U.S. Cl. ............. 340/429; 340/576; 340/407.1
(58) Field of Classification Search ............. 340/429, 340/435, 436, 437, 438, 407.1, 440, 576, 340/903, 904; 701/1, 41, 49; 180/168; 345/7, 345/8, 9
See application file for complete search history.

(56) References Cited

U.S. PATENT DOCUMENTS

| | | | |
|---|---|---|---|
| 5,270,708 A * | 12/1993 | Kamishima | 340/995.24 |
| 6,023,220 A * | 2/2000 | Dobler et al. | 340/440 |
| 6,567,737 B2 * | 5/2003 | Nakamura et al. | 701/96 |
| 6,744,370 B1 | 6/2004 | Sleichter, III et al. | |
| 6,873,892 B2 * | 3/2005 | Katz et al. | 701/49 |
| 6,977,630 B1 * | 12/2005 | Donath et al. | 345/7 |
| 7,091,838 B2 * | 8/2006 | Shimakage | 340/436 |
| 2003/0060936 A1 | 3/2003 | Yamamura et al. | |
| 2004/0225424 A1 | 11/2004 | Yamamura et al. | |

FOREIGN PATENT DOCUMENTS

| | | |
|---|---|---|
| JP | 60-197437 A | 10/1985 |
| JP | 4-76531 | 7/1992 |
| JP | 2000-225877 A | 8/2000 |
| JP | 2002-373399 A | 12/2002 |
| JP | 2003-281698 A | 10/2003 |

* cited by examiner

*Primary Examiner*—Van T. Trieu
(74) *Attorney, Agent, or Firm*—McDermott Will & Emery LLP

(57) ABSTRACT

A driving assistance system and method for providing driving condition information to a driver via a seat with a haptic signal. A set of state signals of the vehicle with respect to a lane on the road is generated. The set of state signals include at least a lateral position signal that indicates a lateral positional relationship of the vehicle with respect to the lane and a heading angle signal that indicates a heading angle of the vehicle with respect to the lane. A haptic signal is generated based on the set of state signals to convey information regarding the lateral positional relationship of the vehicle with respect to the lane and the heading angle of the vehicle with respect to the lane.

23 Claims, 18 Drawing Sheets

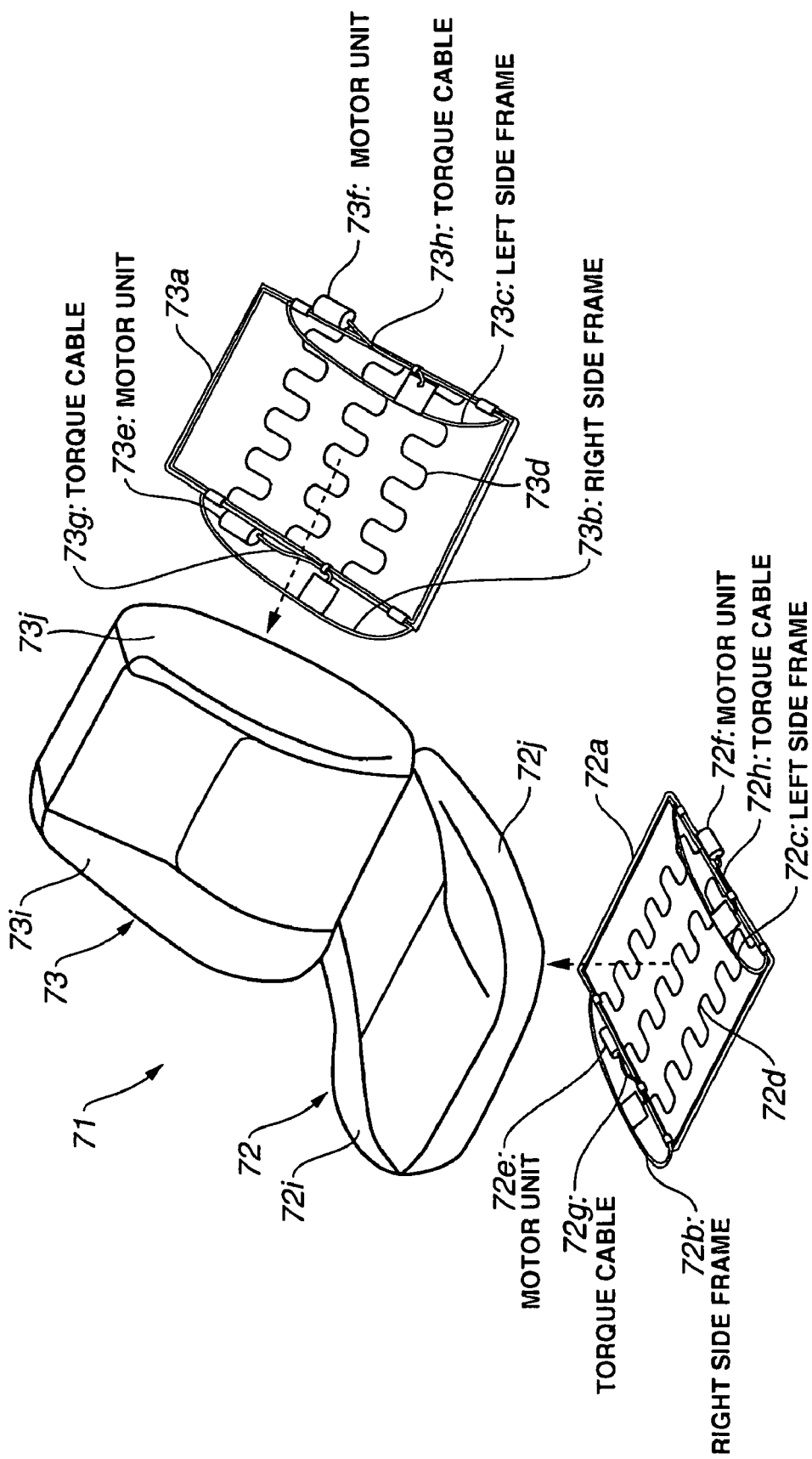

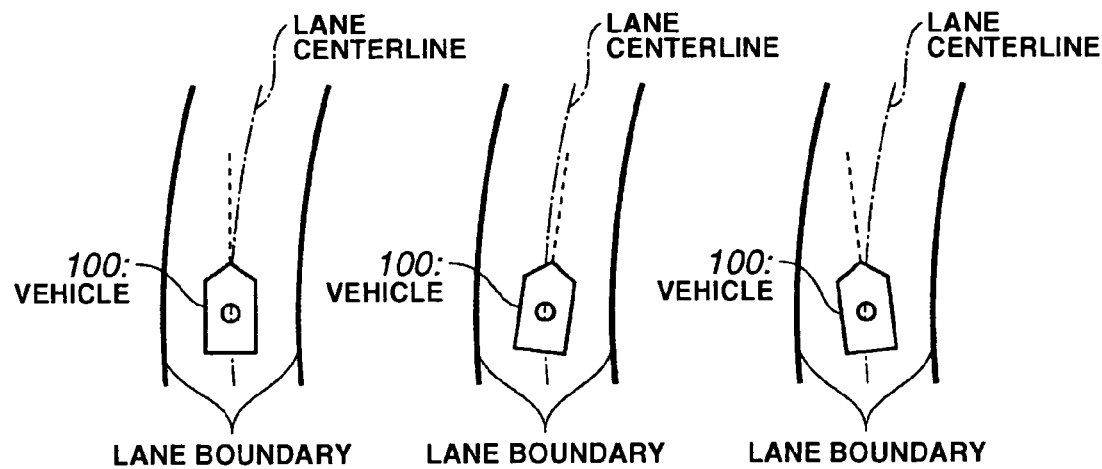
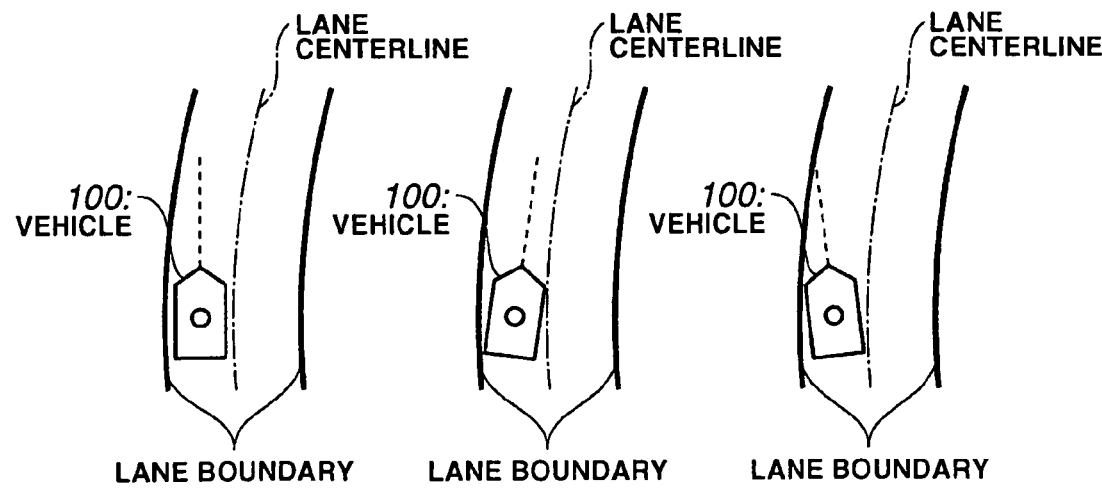

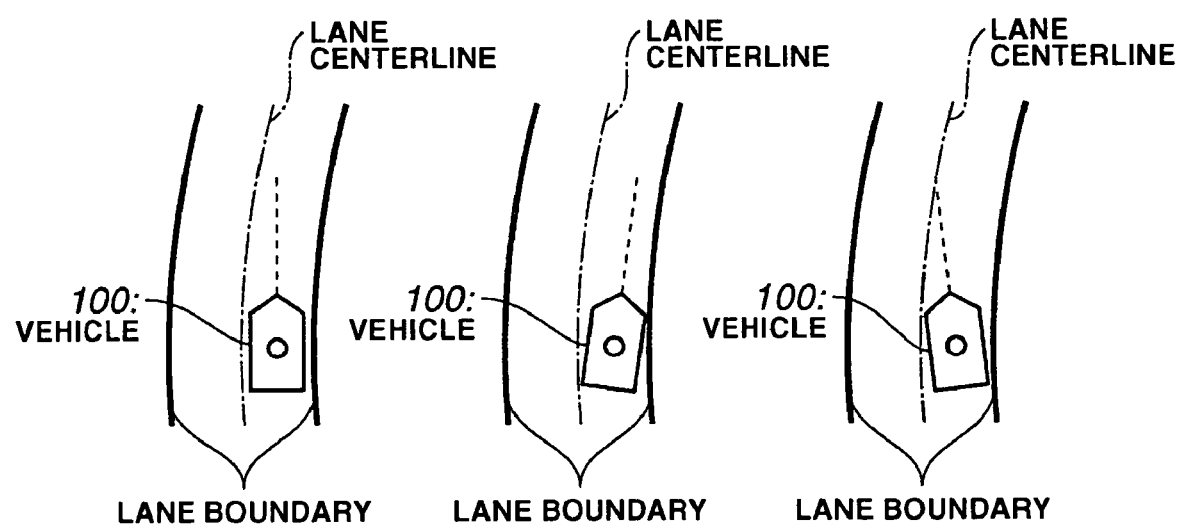

FIG.14

| STRAIGHT ROAD (ρ = 0) | CURVED ROAD (ρ ≠ 0) |
|---|---|
| A CHANGE IN RP AGAINST A CHANGE IN δ | A CHANGE IN RP AGAINST A CHANGE IN δ |

A CHANGE IN RP AGAINST A CHANGE IN δ (STRAIGHT ROAD):

| HEADING ANGLE<br>AN ANGLE OF A VEHICLE WITH RESPECT TO A LANE CENTERLINE | POSITION WITHIN A LANE | |
|---|---|---|
| | CENTER | EDGE |
| IN A DIRECTION APPROACHING A LANE BOUNDARY | SMALL | MIDDLE |
| IN A DIRECTION SEPARATING FROM A LANE BOUNDARY | SMALL | SMALL |

A CHANGE IN RP AGAINST A CHANGE IN θ (STRAIGHT ROAD):

| | POSITION WITHIN A LANE | |
|---|---|---|
| | CENTER | EDGE |
| | MIDDLE | MIDDLE |

A CHANGE IN RP AGAINST A CHANGE IN δ (CURVED ROAD):

| | POSITION WITHIN A LANE | | |
|---|---|---|---|
| | CENTER | OUTER EDGE | INNER EDGE |
| | MIDDLE | LARGE | MIDDLE |

A CHANGE IN RP AGAINST A CHANGE IN θ (CURVED ROAD):

| HEADING ANGLE<br>AN ANGLE OF A VEHICLE WITH RESPECT TO A LANE CENTERLINE | POSITION WITHIN A LANE | | |
|---|---|---|---|
| | CENTER | OUTER EDGE | INNER EDGE |
| IN A DIRECTION TOWARD A CURVED OUTER BOUNDARY | MIDDLE | LARGE | SMALL |
| IN A DIRECTION TOWARD A CURVED INNER BOUNDARY | SMALL | SMALL | MIDDLE |

DRIVING ASSISTANCE METHOD AND SYSTEM WITH HAPTIC NOTIFICATION SEAT

RELATED APPLICATIONS

The present application claims the benefit of priority from Japanese Patent Application No. 2004-032465, filed Feb. 9, 2004, the disclosure of which is incorporated herein by reference in its entirety.

The present application relates to a U.S. patent application entitled "DRIVING INFORMATION SYSTEM WITH HAPTIC NOTIFICATION SEAT," filed concurrently herewith and commonly assigned to the assignee of the present application, the disclosure of which is incorporated herein by reference in its entirety.

FIELD OF DISCLOSURE

The present disclosure relates to a driving assistance method and system that provide haptic notification signals to the driver via a driving seat, to convey information related to a driving condition.

BACKGROUND OF DISCLOSURE

JP-A 2000-225877 discloses a system for assisting a driver occupying a seat within a vehicle traveling on a road. The seat has a vibrator. This vibrator is activated upon detecting an obstacle within a rear region of the vehicle. Via vibration, the driver is informed that the obstacle is approaching. This system, however, does not provide the driver with information related to a state or driving status of the vehicle traveling on the road. Therefore, a need exists for a driving assistance system that can provide haptic notification signals to the driver relating to the state or driving status of the vehicle that is being operated by the driver.

SUMMARY OF THE DISCLOSURE

A driving assistance system and method for conveying driving condition information to a driver from a seat suing haptic signals. An exemplary system includes a sensor and a haptic signal generator. The sensor is configured to detect a lateral position of the vehicle and a heading angle of the vehicle, based on which the haptic signal generator generates a haptic signal applied to the driver from the seat. In one embodiment, the haptic signal generator is configured to determine a first weight for the lateral position and a second weight for the heading angle, and calculate a potential risk based on the first weight, the second weight, the lateral position signal and the heading angle signal. The haptic signal is generated based on the calculated potential risk. The sensor may detect additional parameters, such as a vehicle speed, and/or a curvature of a lane on which the vehicle is being driven. According to one embodiment, the haptic signal generator determines the first weight and the second weight based on the lateral position, the heading angle and the lane curvature.

The weights used in generating the potential risk may be adjusted based on different factors, such as the lateral position of the vehicle relative to a boundary of a lane, the relative position between the vehicle and a determined centerline, and/or the curvature of the lane. For example, the second weight corresponding to the heading angle may increase as the vehicle approaches a lane boundary of a lane on which the vehicle is being driven. According to another example, responsive to the heading angle signal representing that the vehicle deviates from a determined centerline of a lane on which the vehicle is being driven, the second weight increases as the vehicle approaches a lane boundary of the lane. According to another example, responsive to the lane curvature signal representing that the lane is curved, the second weight corresponding to the vehicle traveling towards an outer boundary of the lane and away from a determined centerline of the lane has a greater value than the second weight corresponding to the vehicle traveling away from the outer lane boundary and towards the determined centerline of the lane. According to still another example, responsive to the lane curvature signal representing that the lane is curved, the first weight increases as the vehicle approaches an outer boundary of the lane or as the curvature of the lane increases.

The haptic signal may include one or more haptic signals. In one embodiment, the haptic signal generator applies a first haptic signal to the driver from a first portion of the seat in response to the potential risk having a positive value, and to apply a second haptic signal to the driver from a second portion of the seat in response to the potential risk having a negative value.

Additional objects, advantages and novel features of the examples will be set forth in part in the description which follows, and in part will become apparent to those skilled in the art upon examination of the following and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The figures depict one or more implementations in accord with the present concepts, by way of example only, not by way of limitations. In the figures, like reference numerals refer to the same or similar elements.

FIG. 3 is an exploded view of the seat occupied by the driver.

FIGS. 6(a), 6(b), and 6(c) are state diagrams of a vehicle traveling along a curved lane on a road on or in the proximity of a determined lane centerline.

FIGS. 7(a), 7(b), and 7(c) are state diagrams of a vehicle traveling along a curved lane on a road in proximity of a curved outer lane boundary with three different heading angles.

FIGS. 8(a), 8(b), and 8(c) are state diagrams of a vehicle traveling along a curved lane on a road in the proximity of a curved inner lane boundary with three different heading angles.

FIG. 14 is a table containing results of classification of amounts of a change in potential risk, RP, against a unit change in a lateral position δ or a unit change in a heading angle θ in all possible states.

DETAILED DESCRIPTION OF THE DISCLOSURE

First Exemplary Implementation of the Disclosure

Figure 1:
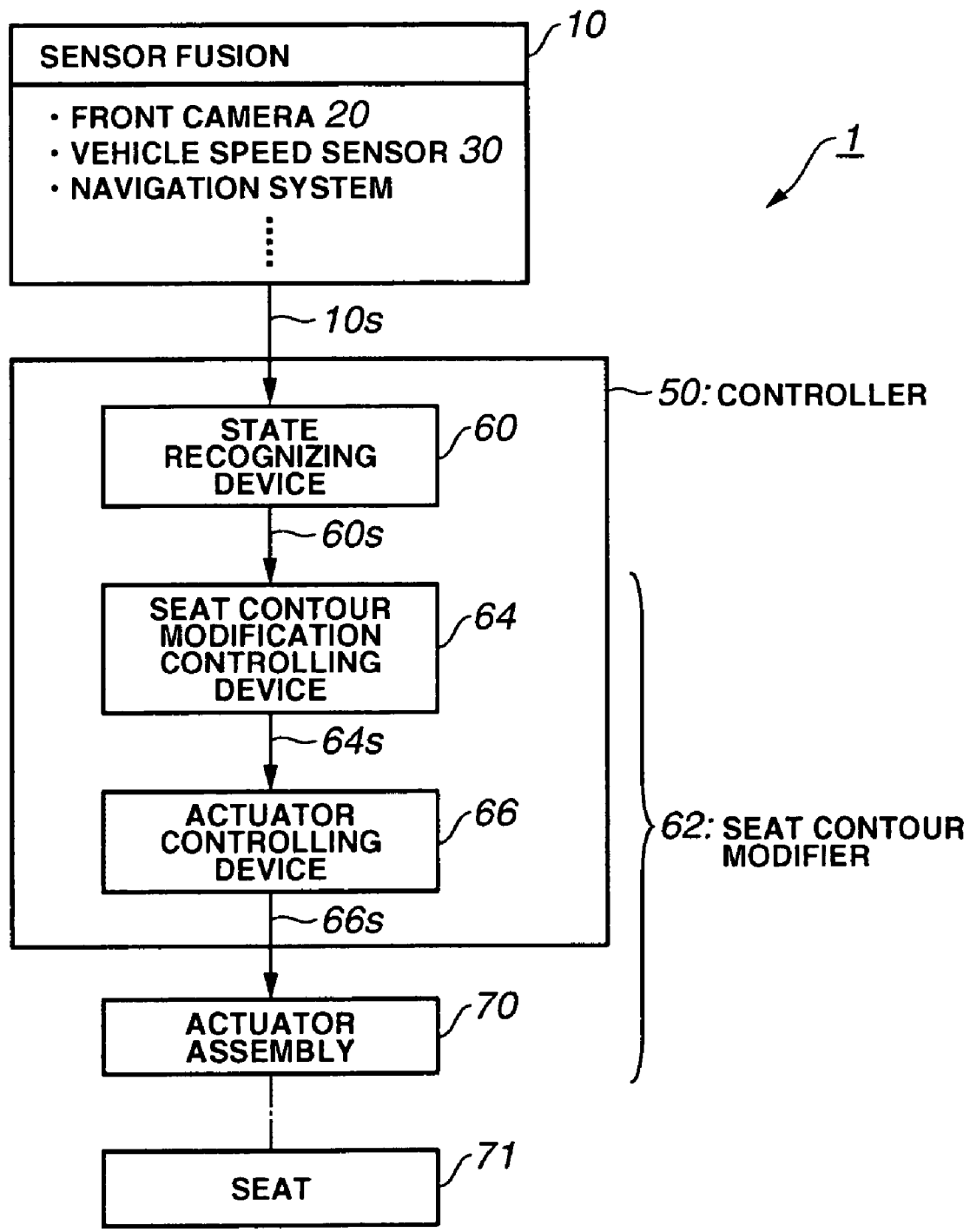
FIG. 1 is a block diagram showing an exemplary operation of a driving assistance system according to the present disclosure.

FIG. 1 is a schematic diagram that illustrates the operation of a driving assistance system 1 according to this disclosure. The system includes a sensor system 10 and a state recognizing device 60. The sensor system 10 may include a desired number of any kinds of sensors or systems or devices for detecting or determining lane boundaries of a desired lane on a road, such as a lane ahead of a vehicle 100, and a status of the vehicle 100 (see FIG. 2). The sensor system 10 may include, for example, a front camera 20, a vehicle speed sensor 30, and a navigation system. The sensor system 10 provides output signals 10s to the state recognizing device 60.

The state recognizing device 60 generates a set of state signals 60s based on the output signals 10s generated by the sensor system 10. The set of state signals 60s includes a lateral position signal that indicates a lateral positional relationship of the vehicle 100 with respect to the lane, and a heading angle signal that indicates a heading angle of the vehicle with respect to the lane. The set of state signals 60s may include a lane curvature signal that indicates a curvature of the lane, namely, a lane curvature.

The state recognizing device 60 provides the set of state signals 60s to a seat contour modifier 62. The seat contour modifier 62 receives the set of state signals 60s and modifies a contour of a seat 71 to produce a haptic signal to the driver to provide information regarding the lateral positional relationship of the vehicle with respect to the lane, and/or the heading angle of the vehicle with respect to the lane.

The seat contour modifier 62 includes a seat contour modification controlling device 64, an actuator controlling device 66 and an actuator assembly 70 coupled to the seat 71.

The seat contour modification controlling device 64 determines a first weight for the lateral position signal and a second weight for the heading angle signal, and applies the determined first and second weights to the lateral position and heading angle signals, respectively. The seat contour modification controlling device 64 calculates a potential risk, RP, based on the weights and the lateral position signal and heading angle signals. The calculated potential risk, RP, is the intended information to be conveyed to the driver. The seat contour modification controlling device 64 provides an output signal 64s indicative of the potential risk, RP, to the actuator controlling device 66.

The actuator controlling device 66 receives the output signal indicative of the potential risk, RP, and causes the actuator assembly 70 to modify the contour of the seat 71 to forward information related to the potential risk, RP, to the driver.

A lateral position signal generating (LPSG) device (not shown) is provided to determine a determined lane centerline between the lane boundaries of the running lane by calculating a location of an intermediate point between the lane boundaries. In this example, the intermediate point is a middle point equidistant from each of the lane boundary. If desired, the intermediate point may be deviated from the middle point towards appropriate one of lane boundaries of a running lane. The term "determined lane centerline" is herein used to mean an imaginary reference line interconnecting the intermediate points, which are equidistant from each of the lane boundaries or slightly deviated from the middle point. The LPSG device calculates or measures a lateral distance of the reference point of the vehicle 100 from the determined centerline within the running lane and determines whether or not this lateral position indicates that the reference point of the vehicle 100 falls in a lane width, W, of the running lane. Only if this is the case, the LPSG device generates the lateral position signal indicative of the calculated lateral position, X. Thus, the lateral position signal indicates the lateral positional relationship of the vehicle 100 with respect to the running lane. The LPSG device provides the lateral position signal to the AC device 54.

Figure 2:
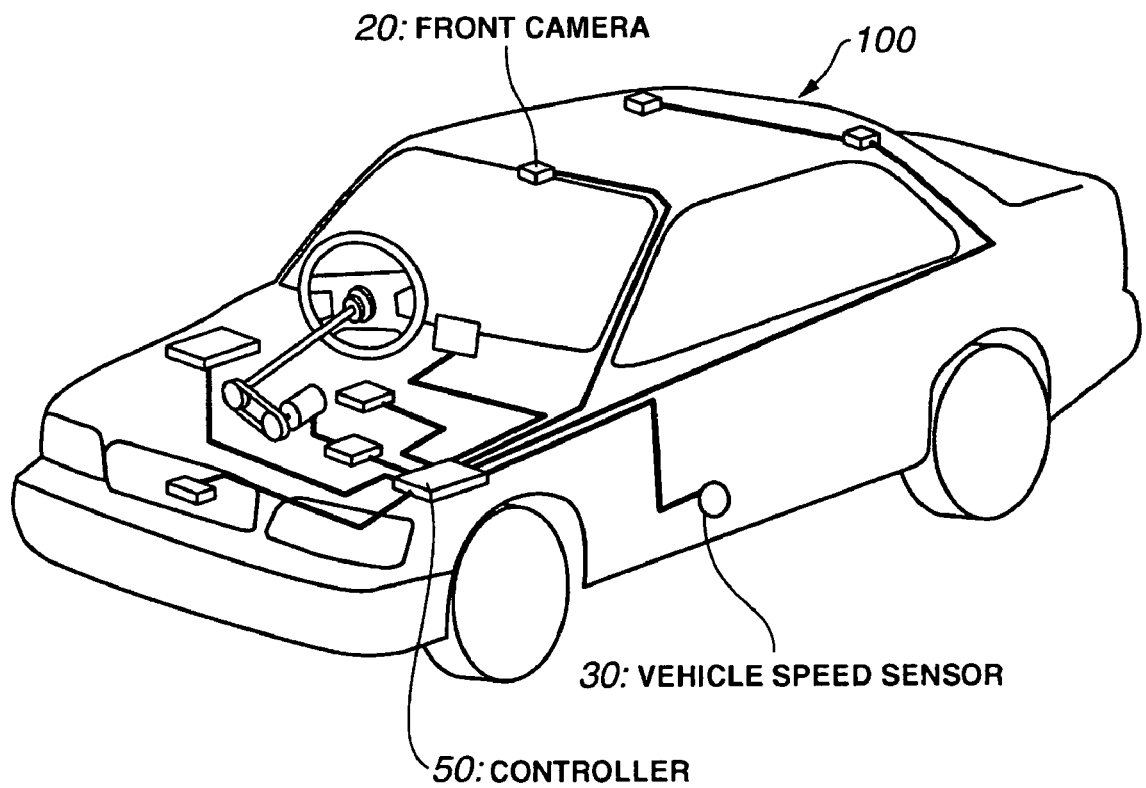
FIG. 2 is a perspective view of a vehicle, in the form of an automobile having a driving assistance system of this disclosure.

With continuing reference to FIGS. 1 and 2, the sensor system 10 is further described. The front camera 20 is of CCD type or CMOS type. The front camera 20 may be mounted to the vehicle 100 in the vicinity of an internal rear view mirror to pick up an image of a road ahead of the vehicle 100. The front camera 20 provides the image to a controller 50. The region covered by the front camera 20 extends from the camera axis to each side by 30 degrees.

The vehicle speed sensor 30 determines a vehicle speed of the vehicle 100 by processing outputs from, for instance, wheel speed sensors. The vehicle speed sensor 30 may include an engine controller or a transmission controller, which can provide a signal indicative of the vehicle speed. The vehicle speed sensor 30 provides, as an output, a signal indicative of a vehicle speed of the vehicle 100 to the controller 50.

The controller 50 responsible for information processing may contain a microprocessor including a central processing unit (CPU), and a computer readable storage media, which includes, for example, a read only memory (ROM), and a random access memory (RAM). The controller 50 contains a software implementation of the state recognizing device 60, a software implementation of the seat contour modification controlling device 64, and a software implementation of the actuator controlling device 66.

The state recognizing device 60 receives a vehicle speed signal from the vehicle speed sensor 30 and images on the road ahead of the vehicle 100 from the front camera 20. The state recognizing device 60 processes the vehicle speed signal and the images to determine a lateral position of the vehicle 100 within a lane and a curvature of the lane. The lateral position of the vehicle 100 as used herein means a distance along an imaginary line between a determined lane centerline to a reference point immediately ahead of the vehicle 100 on a longitudinal line passing the center of vehicle 100, wherein the imaginary line intersects the longitudinal line at a right angle. The determined lane centerline will be described below.

The state recognizing device 60 determines lane boundaries of a lane by detecting markings or objects that identify or mark the boundaries a lane provided by the front camera 20, and determines a determined lane centerline between the lane boundaries by calculating a location of an intermediate point between the lane boundaries. The lane boundaries as used herein may include lane dividers, lane marks, lines, lane stripes, median strips, reflective studs or poles, bots dots, curbs, walls, concrete slabs, jersey barriers and/or guard rails. In this example, the intermediate point is a middle point equidistant from each of the lane boundary. If desired, the intermediate point may be deviated from the middle point towards appropriate one of lane boundaries of a running lane. The term "determined lane centerline" as used herein means an imaginary reference line connecting the intermediate points, which are equidistant from each of the lane boundaries or slightly deviated from the middle point. The LPSG device calculates or measures a lateral distance of the reference point of the vehicle 100 from the determined centerline within the running lane and determines whether or not this lateral position indicates that the reference point of the vehicle 100 falls in a lane width, W, of the running lane. Only if this is the case, the state recognizing device 60 generates the lateral position signal indicative of the calculated lateral position. Thus, the lateral position signal indicates the lateral positional relationship of the vehicle 100 with respect to the lane. The state recognizing device 60 provides the lateral position signal to the seat contour modification controlling device 64. In one embodiment, in addition to the lateral position signal, the state recognizing device 60 provides a heading angle signal that indicates a heading angle of the vehicle 100 and a lane curvature signal that indicates a curvature of the lane to the seat contour modification controlling device 64.

As will be later described in detail, the seat contour modification controlling device 64 determines and applies weights to the lateral position signal and heading angle signals. The seat contour modification controlling device 64 calculates a potential risk, RP, based on the weighted lateral position signal and heading angle signal. In the embodiment, the potential risk, RP, represents a risk caused due to the relationship between the vehicle and lane boundaries, which varies with different heading angles of the vehicle 100 within the lane. The seat contour modification controlling device 64 provides the output signal 64s indicative of the potential risk, RP, to the actuator controlling device 66.

In response to the output signal 64s, the actuator controlling device 66 determines instructions to be applied to the actuator assembly 70 coupled to the seat 71. In the embodiment, the potential risk, RP, constitutes information regarding the lateral relationship of the vehicle 100 with respect to the lane and the heading angle of the vehicle within the lane. Via a haptic input to the driver from the seat 71, this information regarding the lateral relationship of the vehicle 100 with respect to the lane and the heading angle of the vehicle within the lane is forwarded to the driver. The actuator controlling device 66 determines output signals 66s indicative of the determined instructions and provides the output signals 66s to the actuator assembly 70.

In response to the instructions, the actuator assembly 70 produces a haptic input to the driver from the seat 71, thereby to forward the potential risk, RP, to the driver by stimulating a tactual sense. In the exemplary embodiment, the actuator assembly 70 is designed to produce a haptic input to the driver by modifying contour of at least one of a first or right side portion of the seat 71 and a second or left side portion thereof. For better understanding of the stimulus that the driver receives by the haptic input, structure and operation of the seat 71 occupied by the driver operating the vehicle 100 (see FIG. 2) are described below.

With reference now to FIG. 3, the seat 71 includes a cushion 72, a back rest 73 and a head rest (not shown). The cushion 72 includes a seat cushion frame 72a and two side frames, namely, a right side frame 72b and a left side frame 72c. The cushion 72 also includes pads covering these frames 72a, 72b, and 72c. The seat cushion frame 72a has springs 72d attached thereto to support the pad. The back rest 73 includes a seat back frame 73a and two side frames, namely, a right side frame 73b and a left side frame 73c. The back rest 73 also includes pads covering these frames 73a, 73b, and 73c. The seat back frame 73a has springs 73d attached thereto to support the pad.

In order to permit contour modification of sides of the cushion 72, the side frames 72b and 72c are movingly connected to the right and left sides of the seat cushion frame 72a, respectively, for angular movements. In order to permit contour modification of side portions of the back rest 73, the side frames 73b and 73c are movingly connected to the right and left sides of the back rest 73, respectively, for angular movements.

In order to control angular positions of the side frames 72b and 72c of the cushion 72, the actuator assembly 70 includes motor units 72e and 72f for the side frames 72b and 72c, respectively. The motor units 72e and 72f are attached to the cushion 72. Output torque of the motor unit 72e is transmitted by a torque cable 72g to the right side frame 72b, thereby to rotate the right side frame 72b about the right side edge of the seat cushion frame 72a. Output torque of the motor unit 72f is transmitted by a torque cable 72h to the left side frame 72c, thereby to rotate the left side frame 72c about the left side edge of the seat cushion frame 72a. In order to control angular positions of the side frames 73b and 73c of the back rest 73, the actuator assembly 70 includes motor units 73e and 73f for the side frames 73b and 73c, respectively. The motor units 73e and 73f are attached to the back rest 73. Output torque of the motor unit 73e is transmitted by a torque cable 73g to the right side frame 73b, thereby to rotate the right side frame 73b about the right side of the seat back frame 73a. Output torque of the motor unit 73f is transmitted by a torque cable 73h to the left side frame 73c, thereby to rotate the left side frame 73c about the left side of the seat back frame 73a.

The actuator assembly 70 controls activation and the direction of rotation of each of the motor units 72e, 72f, 73e, and 73f.

Rotation of the motor unit 72e in one direction causes the right side frame 72b to rotate in the same direction to press a right side portion 72i of the cushion 72 firmly against a femoral region of the right leg of the driver. Subsequently, rotation of the motor unit 72e in an opposite direction causes the right side frame 72b to rotate in the same opposite direction to move the right side portion 72i of the cushion 72 away from the femoral region of the right leg of the driver, eliminating or at least reducing pressure applied to the femoral region of the right leg of the driver. Rotation, in one direction, of the motor unit 72f causes the left side frame 72c to rotate in the same direction to press a left-hand side edge portion 72j of the cushion 72 firmly against a femoral region of the left leg of the driver. Subsequently, rotation, in the opposite direction, of the motor unit 72f causes the left side frame 72c to rotate in the same opposite direction to move the left side portion 72j of the cushion 72 away from the femoral region of the left leg of the driver, eliminating or at least reducing pressure applied to the femoral region of the left-hand leg of the driver.

Rotation, in one direction, of the motor unit 73e causes the right side frame 73b to rotate in the same direction to press a right side portion 73i of the back rest 73 firmly against a right-hand side of the driver. Subsequently, rotation, in the opposite direction, of the motor unit 73e causes the right side frame 73b to rotate in the same opposite direction to move the right side portion 73i of the back rest 73 away from the right-hand side of the driver, eliminating or at least reducing pressure applied to the right-hand side of the driver. Rotation, in one direction, of the motor unit 73f causes the left side frame 73c to rotate in the same direction to press a left-hand side edge portion 73j of the back rest 73 firmly against a left-hand side of the driver. Subsequently, rotation, in the opposite direction, of the motor unit 73f causes the left side frame 73c to rotate in the same opposite direction to move the left-hand side edge portion 73j of the back rest 73 away from the left-hand side of the driver, eliminating or at least reducing pressure applied to the left-hand side of the driver.

From the preceding descriptions, it is understood that the driver is kept informed of information regarding the lateral position within the lane and the heading angle within the lane via haptic inputs from the side portions 72i and 73i on the right, or side portions 72j and 73j on the left. In the embodiment, information related to the potential risk, RP, is forwarded to the driver via haptic inputs in the form of pressure or force stimulating the femoral region and/or the side of the driver.

From the preceding description, it is understood that weighting the lateral position and heading angle signals, and calculating the potential risk, RP, from the weighted signals are just one exemplary processes of correlating the lateral position signal with the heading angle signal to provide appropriate information to the driver. For better understanding the embodiment, one example of correlating the lateral position signal with the heading angle signal will be described below utilizing the state diagrams shown in FIGS. 4(a) to 8(c).

Figure 4A:
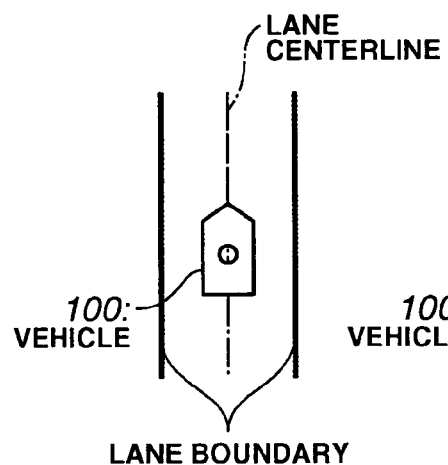
FIGS. 4(a), 4(b), and 4(c) are state diagrams of a vehicle traveling along a straight lane on a road on or in the proximity of a determined lane centerline with three different heading angles.
Figure 4B:
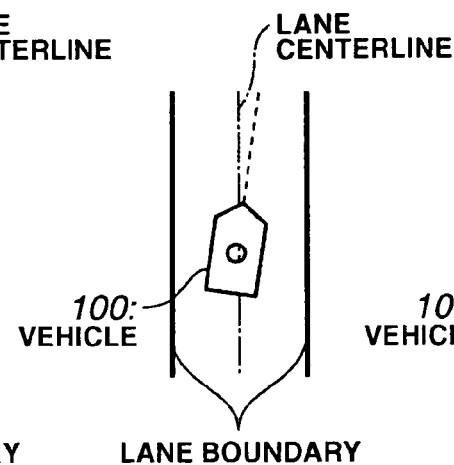
Figure 4C:
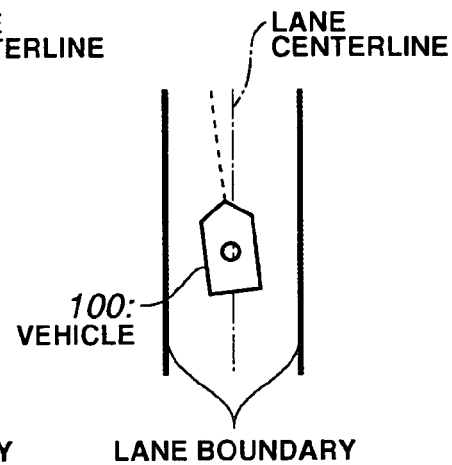

FIGS. 4(a), 4(b), and 4(c) illustrate states of a vehicle 100 traveling along a straight lane on a road on or in the proximity of a determined lane centerline with three different heading angles. A heading angle represents a direction in which the vehicle 100 is traveling with respect to a tangent to the determined lane centerline or a lane boundary. In FIG. 4(a), the vehicle 100 is heading in a direction along the lane centerline, and thus the heading angle is zero. In FIG. 4(b), the vehicle 100 is heading towards a lane boundary on the right, and thus the heading angle is greater than zero. In FIG. 4(c), the vehicle 100 is heading towards a lane boundary on the left, and thus the heading angle is less than zero. In each of the states shown in FIGS. 4(a) to 4(c), information on a lateral position of the vehicle 100 is heavily weighted and the contour of seat 71 is modified to impressively forward the information related to the lateral position of vehicle 100 to the driver. Even if the vehicle 100 is heading towards the lane boundary as shown in FIGS. 4(b) and 4(c), information on the heading angle is less weighted and the seat 71 is modified to less impressively forward information related to the heading angle to the driver.

Figure 5A:
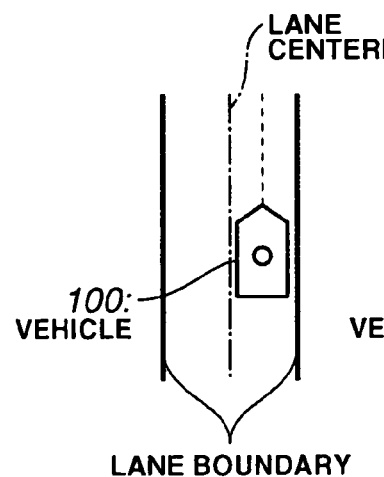
FIGS. 5(a), 5(b), and 5(c) are state diagrams of a vehicle traveling along a straight lane on a road in the proximity of a lane boundary with three different heading angles.
Figure 5B:
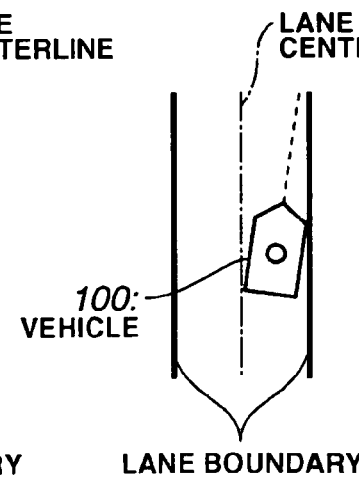
Figure 5C:
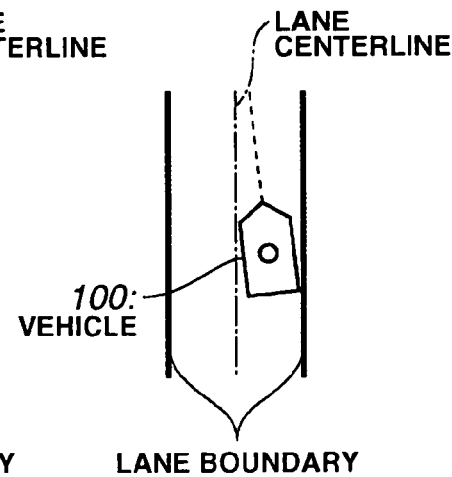

FIGS. 5(a), 5(b), and 5(c) illustrate states of a vehicle 100 traveling along a straight lane on a road in the proximity of a lane boundary with three different heading angles. In FIG. 5(a), the vehicle 100 is heading in a direction along a determined lane centerline, and thus the heading angle is zero. In FIG. 5(b), the vehicle 100 is heading towards the lane boundary on the right, and thus the heading angle is greater than zero. In FIG. 5(c), the vehicle 100 is heading away from the lane boundary towards the lane centerline, and thus the heading angle is less than zero. In each of the states shown in FIGS. 5(a) to 5(c), the contour of seat 71 is modified to forward information of a lateral distance of the vehicle 100 with respect to the lane and information related to the heading angle. The information related to the heading angle is heavily weighted if the vehicle 100 is heading towards the lane boundary as shown in FIG. 5(b) and the contour of seat 71 is modified to impressively forward the positional information to the driver. It is noted that the heading angle represents an angle with which the vehicle 100 is approaching the lane boundary. If the vehicle 100 is heading away from the lane boundary towards the lane centerline as shown in FIG. 5(c), information related to the heading angle is less weighted and the contour of seat 71 is modified less impressively.

FIGS. 6(a), 6(b), and 6(c) illustrate states of a vehicle 100 traveling along a curved lane on or in the proximity of a determined lane centerline with three different heading angles. In FIG. 6(a), the vehicle 100 is heading in a direction along a tangent to the lane centerline, and thus the heading angle is zero. In FIG. 6(b), the vehicle 100 is heading towards a curved inner lane boundary on the right, and thus the heading angle is greater than zero. In FIG. 6(c), the vehicle 100 is heading towards a curved outer lane boundary on the left, and thus the heading angle is less than zero. In each of the states shown in FIGS. 6(a) to 6(c), the contour of seat 71 is modified to forward information related to a lateral position of the vehicle 100 with respect to the lane and information regarding whether or not the vehicle 100 is heading towards the curved outer lane boundary to the driver. The information related to the heading angle of the vehicle is heavily weighted if the vehicle 100 is heading towards the curved outer lane boundary as shown in FIG. 6(c) and the contour of seat 71 is modified to impressively forward the positional information to the driver. If the vehicle 100 is heading towards the curved inner lane boundary as shown in FIG. 6(b), the information on the heading angle of the vehicle 100 is less weighted and the contour of seat 71 is modified to a lesser degree.

FIGS. 7(a), 7(b), and 7(c) illustrate states of a vehicle 100 traveling along a curved lane on a road in the proximity of a curved outer lane boundary on the left with three different heading angles. In FIG. 7(a), the vehicle 100 is heading in a direction along a tangent to a determined lane centerline, and thus the heading angle is zero. In FIG. 7(b), the vehicle 100 is heading away from the curved outer lane boundary on the left towards the lane centerline, and thus the heading angle is greater than zero. In FIG. 7(c), the vehicle 100 is heading towards the curved outer lane boundary on the left, and thus the heading angle is less than zero. In each of the states shown in FIGS. 7(a) to 7(c), the contour of seat 71 is modified to forward information related to a lateral distance of the vehicle 100 with respect to the lane and information related to the heading angle of the vehicle 100 to the driver. The information related to the heading angle is heavily weighted if the vehicle 100 is heading towards the curved outer lane boundary as shown in FIG. 7(c), and the contour of seat 71 is modified to impressively forward the information to the driver. If the vehicle 100 is heading away from the curved outer lane boundary towards the lane centerline as shown in FIG. 7(b), the information on the heading angle is less weighted and the contour seat 71 is modified to less impressively forward the positional information to the driver.

FIGS. 8(a), 8(b), and 8(c) illustrate states of a vehicle 100 traveling along a curved lane on a road in the proximity of a curved inner lane boundary on the right with three different heading angles. In FIG. 8(a), the vehicle 100 is heading in a direction along a tangent to a determined lane centerline, and thus the heading angle is zero. In FIG. 8(b), the vehicle 100 is heading towards the curved inner lane boundary on the right, and thus the heading angle is greater than zero. In FIG. 8(c), the vehicle 100 is heading away from the curved inner lane boundary on the right towards the lane centerline, and thus the heading angle is less than zero. In each of theses states shown in FIGS. 7(a) to 7(c), the seat 71 is modified in contour to forward information related to a lateral position of the vehicle 100 with respect to the lane to the driver. However, information related to the heading angle of the vehicle 100 is less weighted and the contour of seat 71 is modified to less impressively forward the information to the driver.

Figure 9:
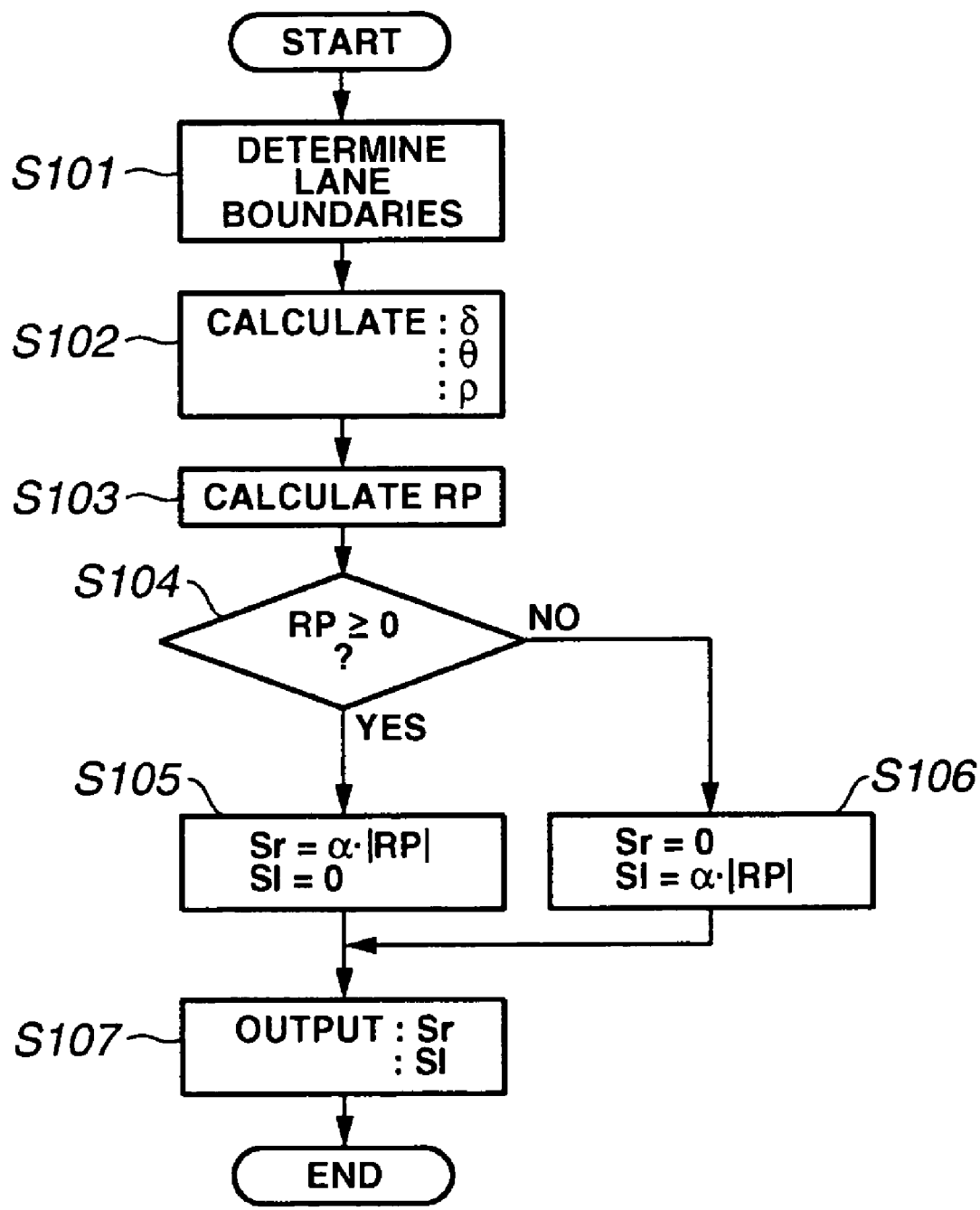
FIG. 9 is a flow chart of a control routine.

The concepts of this disclosure will be further described utilizing the flow chart of FIG. 9. The flow chart in FIG. 9 illustrates a control routine stored in a computer readable storage medium. Execution of this control routine is repeated at an interval of 50 milliseconds.

In FIG. 9, at step S101, lane boundaries of a lane are determined by processing images picked-up by the front camera 20 to detect lane markings on a road ahead of the vehicle 100.

Figure 10:
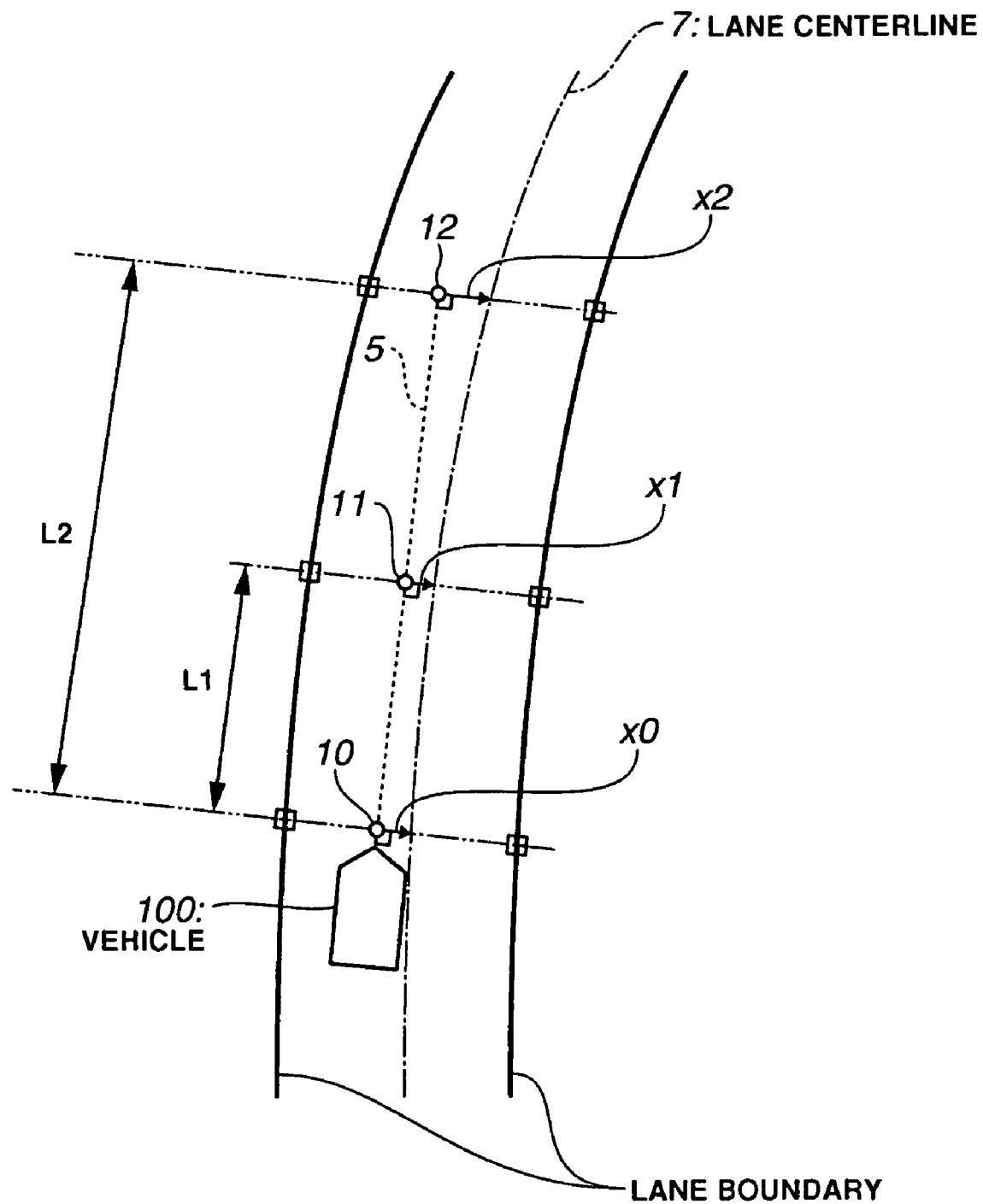
FIG. 10 is a state diagram of a vehicle traveling along a curved lane on a road, illustrating the manner of computing variables representing a positional relationship of the vehicle within the lane.

At step S102, a lateral position δ, a heading angle θ, and a lane curvature ρ are calculated as variables representing a positional relationship of the vehicle 100 within the lane. With reference now to FIG. 10, the manner of calculating them is described.

In the state diagram of FIG. 10, a straight longitudinal line 5 passing through a center of the vehicle 100 is illustrated by the broken line. A determined lane centerline 7 is illustrated by the one-dot chain line. In the embodiment, the determined centerline 7 interconnects middle points between the lane boundaries. Three phantom line drawn imaginary traverse lines intersect the longitudinal line 5 at right angles at three measurement points 10, 11, and 12 ahead of the vehicle 100. The three measurement points 10, 11, and 12 are on the longitudinal line 5. The measurement pint 10 is immediately ahead of the vehicle 100. The measurement point 11 is spaced from the measurement point 10 by a first distance L1. The measurement point 12 is spaced from the measurement point 10 by a second distance L2 that is longer than the first distance L1.

A lateral position δ is detected at each of the three measurement points 10, 11, and 12 using the picked up images by the front camera. Each of the lateral positions δ is a length ×0 or ×1 or ×2 measured from one of the measurement points 10, 11, and 12 along the associated one of the imaginary traverse lines to the determined centerline 7. The lateral positions δ are ×0 at the measurement point 10, ×1 at the measurement point 11, and ×2 at the measurement point 12, respectively. The lateral position δ is zero at a measurement point on the determined lane centerline 7. The sign of lateral position δ is plus when the measurement point falls in a range from the determined lane centerline 7 to the lane boundary on the right and is minus when the measurement point falls in a range from the determined lane centerline 7 to the lane boundary on the left. The lateral position δ is zero at the measurement point outside of the lane.

Figure 11:
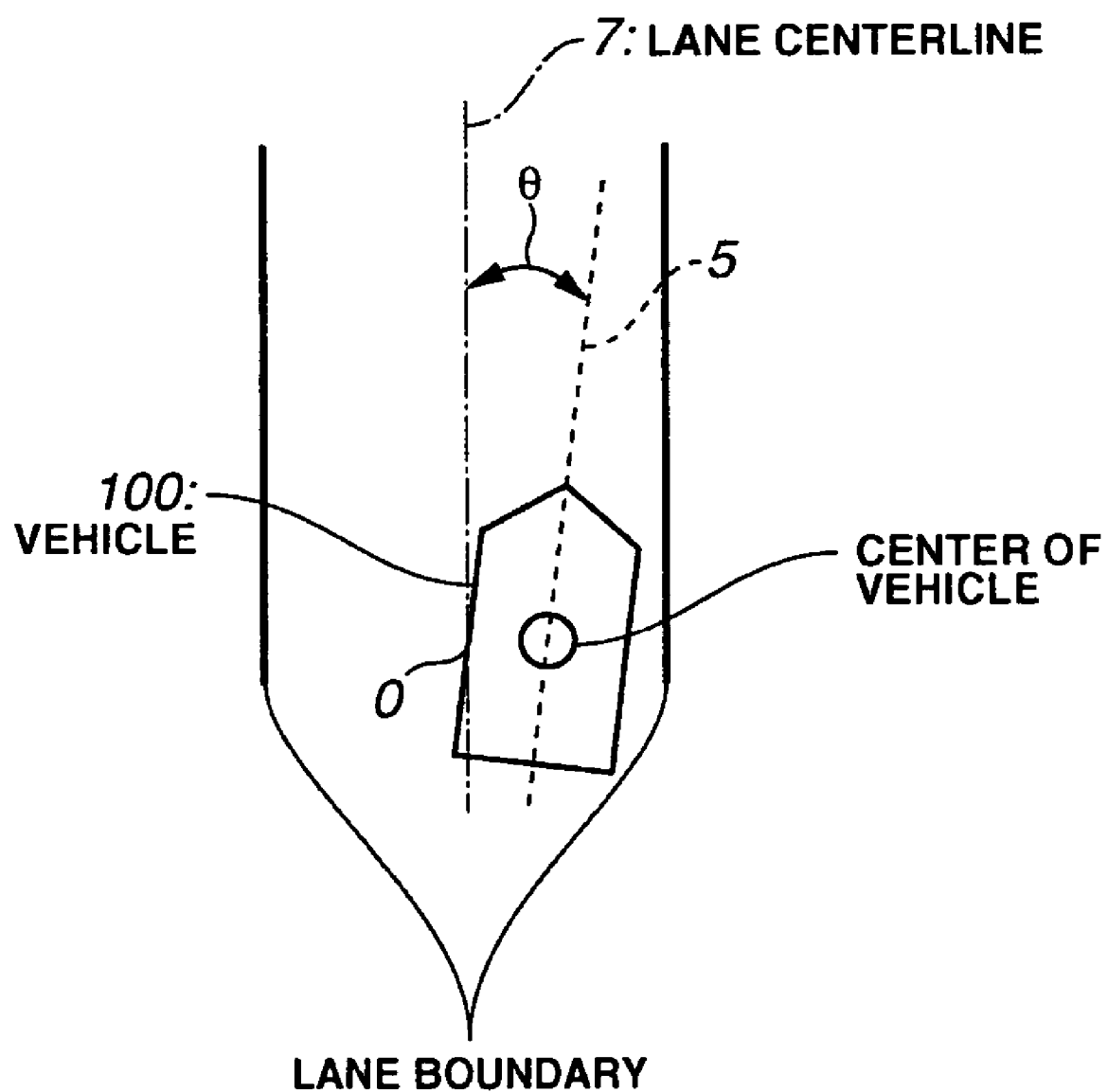
FIG. 11 is a state diagram of a vehicle traveling along a lane on a road, illustrating a heading angle of the vehicle.

With reference to FIG. 11, the longitudinal line 5 passing through the center of the vehicle 100 indicates the direction in which the vehicle 100 is traveling. As shown in FIG. 11, the heading angle θ is an angle between the longitudinal line 5 and a tangent to the determined lane centerline 7. The heading angle θ represents the direction in which the vehicle 100 is traveling with respect to the lane. The heading angle θ is zero when the longitudinal line 5 is parallel to the tangent to the determined lane centerline 7. The sign of the heading angle θ is plus when the longitudinal line 5 is angled towards the lane boundary on the right and is minus when the longitudinal line 5 is angled towards the lane boundary on the left. The heading angle θ may be expressed as:

$$\sin \theta = \{L2^2 \cdot x1 - L1^2 \cdot x2 - (L2^2 - L1^2) \cdot x0\}/\{L1 \cdot L1\} \quad (1)$$

The heading angle θ may be calculated from sin θ.

The lane curvature ρ is zero when the lane is straight. The sigh of the lane curvature ρ is plus when the lane is curved rightwards as shown in FIG. 10, and is minus when the lane is curved leftwards. The lane curvature ρ may be expressed as:

$$\rho = 2 \cdot \{L2 \cdot x1 - L1 \cdot x2 - (L2-L1) \cdot x0\} / \{L1 \cdot L2 \cdot (L2-L1)\} \quad (2)$$

With reference back to FIG. 9, the control routine proceeds from step S102 to step S103. At step S103, the potential risk, RP, is calculated by determining a first weight kδ to be applied to the lateral position δ, and a second weight kθ to be applied to the heading angle θ. In the equation of the potential risk, RP, which will be described later, the second weight kθ is applied to sin θ. However, the second weight kθ may be called a weight to be applied to the heading angle θ.

Accounting for the lateral position δ and lane curvature ρ, the first weight kδ may be expressed as:

If δ·ρ<0 {the states illustrated in FIGS. 7(*a*) to 7(*c*) when the vehicle 100 is traveling along a curved lane in the proximity of a curved outer lane boundary}, then $$k\delta(\delta, \rho) = k1 \cdot (1 + a1 \cdot |\rho|) \quad (3)$$

If δ·ρ≧0 {the states illustrated in FIGS. 4(*a*) to 6(*c*), and FIGS. 8(*a*) to 8(*c*) when the vehicle 100 is traveling along a curved lane in the proximity of a determined lane centerline or a curved inner lane boundary or traveling along a straight lane}, then $$k\delta(\delta, \rho) = k1 \quad (4)$$

Accounting for the lateral position δ, heading angle θ, and lane curvature ρ, the second weight kθ may be expressed as:

If δ·θ≧0 {the states illustrated in FIGS. 5(*b*) and 7(*c*) when the vehicle 100 is heading in a direction deviating from a lane}, then $$k\theta(\delta, \theta, \rho) = k21 \cdot (1 + a2 \cdot |\rho|) \cdot |\delta| \quad (5)$$

If δ·θ<0 {the states illustrated in FIGS. 5(*c*) and 7(*b*) when the vehicle 100 is not heading in a direction deviating from a lane}, then $$k\theta(\delta, \theta, \rho) = k22 \cdot (1 + a2 \cdot |\rho|) \cdot |\delta| \quad (6)$$

where: k22≦k21.

Using the above-mentioned weights kδ and kθ, the potential risk, RP, is given by the following equation:

$$RP = k\delta(\delta, \rho) \cdot \delta + k\theta(\delta, \theta, \rho) \cdot \sin \theta \quad (7)$$

Apparently, the potential risk RP is a sum of a first term representing a weight applied lateral position δ and a second term representing a weight applied heading angle sin θ.

In FIG. 9, the control routine proceeds from step S103 to interrogation step S104. At step S104, it is determined whether or not the potential risk, RP, is greater than or equal to 0 (zero). If the potential risk, RP, is greater than or equal to zero (RP≧0), the control routine proceeds to step S105. If the potential risk, RP, is less than zero (RP<0), the control routine proceeds to step S106.

At step S105 or S106, an angular position of right side portions 72*i* and 73*i* from their rest positions, Sr, and an angular position of left side portions 72*j* and 73*j* from their rest positions, Sl, are determined. The right side portions 72*i* and 73*i* are designed to angularly move inwardly to the angular position Sr from their rest positions to apply pressure to the driver from the right. The left side portions 72*j* and 73*j* are designed to angularly move inwardly to the angular position Sl from their rest positions to apply pressure to the driver from the left.

If the potential risk, RP, is greater than, or equal to, zero (RP≧0), at step S105, the angular position Sl is set to be equal to 0 (Sl=0) and the angular position Sr is given as:

$$Sr = \alpha \cdot |RP| \quad (8)$$

where: α is the constant.

The angular position Sr to which the right side portions 72*i* and 73*i* are angularly moved from their rest positions is increased with an increase in the magnitude of the potential risk, RP. The constant α may be determined to apply appropriate varying pressure input to the driver with different values of the angular position of right side portions 72*i* and 73*i* of the seat 71 in accordance with the magnitude of the potential risk, RP. As the angular position Sl is zero, the left side portion 72*j* and 73*j* are at their rest positions, and no pressure is applied to the driver from the left.

If the potential risk, RP, is less than zero (RP<0), at step S106, the angular position Sr is set equal to 0 (Sr=0) and the angular position Sl is given as:

$$Sl = \alpha \cdot |RP| \quad (9)$$

where: α is the constant.

The angular position Sl to which the left side portions 72*j* and 73*j* are angularly moved from their rest positions is increased with an increase in the magnitude of the potential risk, RP. The constant α may be determined to apply appropriate varying of pressure input to the driver with different values of the angular position of left side portions 72*j* and 73*j* of the seat 71 in accordance with the magnitude of the potential risk, RP. As the angular position Sr is zero, the right side portion 72*i* and 73*i* are at their rest positions, and no pressure is applied to the driver from the right.

In FIG. 9, the control routine proceeds from step S105 or S106 to step 107. At step S107, the angular positions Sr and Sl are provided, as output signals 66*s* (see FIG. 1), to the actuator assembly 70 coupled to the seat 71 to forward information related to the potential risk, RP, to the driver.

In the states illustrated in FIGS. 5(*b*) and 7(*c*), the product δ·θ is greater than zero (δ·θ>0). Under this condition, the second weight kθ is given by equation (5). In equation (5), the second weight kθ is increased linearly with the magnitude of the lateral position |δ|. In equation (7), the term representing the heading angle θ is heavily weighted as the vehicle 100 approaches the lane boundary, causing a remarkable increase in the potential risk, RP, with an increase in the heading angle θ. Thus, information related to the heading angle of the vehicle 100 with respect to the lane boundary is impressively forwarded to the driver.

In the state illustrated in FIG. 5(*b*), via an increase in each of haptic inputs to the driver from the right side portions 72*i* and 73*i* of the seat 71, information that the vehicle 100 is approaching the lane boundary on the right is impressively forwarded to the driver, prompting the driver to operate the vehicle 100 away from the lane boundary on the right.

In the state illustrated in FIG. 7(*c*), via an increase in each of haptic inputs to the driver from the left side portions 72*j* and 73*j* of the seat 71, information that the vehicle 100 is approaching the curved outer lane boundary on the left is impressively forwarded to the driver, prompting the driver to operate the vehicle 100 away from the curve outer lane boundary on the left, In the states illustrated in FIGS. 4(*a*) and 8(*a*), the first weight kδ is fixed at the constant k1 (see equation (4)). In FIG. 4(*a*), the vehicle 100 is traveling along a straight lane in the proximity of the determined lane centerline with zero heading angle (θ=0). In FIG. 8(*a*), the vehicle 100 is traveling along a curved lane in the proximity of the curved inner lane boundary on the right with zero heading angle ($\theta=0$). Under these conditions, the term representing the heading angle is zero in the equation (7), and the potential risk, RP, varies depending on a change in the lateral position $\delta$. As long as the driver keeps driving tracking the determined lane centerline (zero heading angle), the driver is allowed to follow any desired line deviating from the determined centerline while recognizing the amount of the deviation via haptic inputs from the right or left seat side portions 72*i* and 73*i* or 72*j* and 73*j*.

In the states illustrated in FIGS. 7(*a*) to 7(*c*) when the vehicle 100 is traveling along a curved lane in the proximity of the curved outer lane boundary, the first weight k$\delta$ is given as a product of the constant k1 and the term (1+a1·|ρ|) (see the equation (3)). Thus, information regarding a change in the lateral position $\delta$ is impressively forwarded to the driver via haptic inputs from the left side portions 72*j* and 73*j* of the seat 71.

In the state illustrated in FIG. 7(*c*), the second weight k$\theta$ is given as a product of the constant k21 and the term (1+a2·|ρ|) (see equation (5)), so that information regarding the heading angle $\theta$ that the vehicle is heading outwardly of the curve and away from the determined centerline is more impressively forwarded to the driver via greatly increased haptic inputs from the left side portions 72*j* and 73*j* of the seat 71.

In the state illustrated in FIG. 7(*b*), the second weight k$\theta$ is given as a product of the constant k22 (less than K21) and the term (1+a2·|ρ|) (see equation (6)), so that information regarding the heading angle $\theta$ is less impressively forwarded to the driver via less increased haptic inputs from the left side portions 72*j* and 73*j* because the vehicle 100 is heading towards the determined centerline of the curved lane.

The first exemplary implementation described will be better understood from the following descriptions.

(1) The seat contour modifier 62 is controlled to forward information regarding the lateral position $\delta$ and heading angle $\theta$ of the vehicle 100 within the lane to the driver via haptic inputs, in the form of pressure, from the seat 71. The seat contour modifier 62 may modify contour of the seat 71 to produce the haptic inputs to the driver. The driver is kept informed of the positional relationship of the vehicle 100 with respect to the lane via the haptic inputs by modification of the contour of the seat 71. Thus, the driver is prompted to properly driving the vehicle 100 within the lane.

(2) The first weight k$\delta$ for the lateral position $\delta$ and the second weight k$\theta$ for the heading angle $\theta$ are determined based on the lateral position $\delta$, heading angle $\theta$ and lane curvature $\rho$. The potential risk, RP, is determined as a sum of the (first) weight k$\delta$ applied lateral position $\delta$ and the (second) weight k$\theta$ applied heading angle $\theta$. The actuator assembly 70 is controlled to forward the potential risk, RP, to the driver via haptic inputs, in the form of pressure, from the seat 71 by modification of the contour of the seat 71. Thus, the driver is kept informed of the lateral position $\delta$ and heading angle $\theta$ of the vehicle 100 via haptic inputs well to recognize the potential risk well before actual appearance of risk.

(3) The first weight k$\delta$ for the lateral position and the second weight k$\theta$ for the heading angle $\theta$ are calculated based on the lateral position $\delta$, heading angle $\theta$ and lane curvature $\rho$. Thus, the first weight k$\delta$ and second weight k$\theta$ may vary with different states of the vehicle 100 traveling on a road, making it possible to emphasize a necessary portion of information and forward the appropriately emphasized portion to the driver.

(4) As readily seen from equations (5) and (6), the second weight k$\theta$ for the heading angle $\theta$ is increased as the magnitude of the lateral position 161 increases. In other words, as the vehicle 100 approaches a lane boundary, the second weight k$\theta$ is increased. This makes it possible to forward to the driver information in which the heading angle $\theta$ is emphasized when the vehicle 100 is traveling in the proximity of the lane boundary.

(5) As readily seen from equation (5), when the heading angle $\theta$ indicates that the vehicle 100 is traveling in a direction deviating from a lane, the second weight k$\theta$ for the heading angle $\theta$ is increased as the vehicle 100 approaches a lane boundary. This makes it possible to forward to the driver information in which the heading angle $\theta$ is more emphasized when the vehicle 100 is traveling in the proximity of the lane boundary.

(6) As readily seen from equation (3), the first weight k$\delta$ for the lateral position $\delta$ is increased as the magnitude of the lane curvature |ρ| increases. This makes it possible to forward to the driver information in which the lateral position $\delta$ is emphasized when the vehicle 100 is traveling along a curved lane.

(7) As described before in connection with FIG. 11, the lateral position $\delta$ is 0 (zero) at the measurement point on the determined centerline. It has a plus sign when the measurement point falls in a range between the determined centerline to a lane boundary on the right, and a minus sign when the measurement point falls in a range between the determined centerline to a lane boundary on the left. The heading angle $\theta$ is 0 (zero) when the longitudinal line passing through the center of the vehicle 100 is parallel to the tangent to the determined lane centerline. It has a plus sign when the longitudinal line is angled towards the lane boundary on the right and a minus sign when the longitudinal line is angled towards the lane boundary on the left. Using the lateral position $\delta$ and heading angle $\theta$, the potential risk, RP, is calculated. The seat contour modifier 62 is responsive to the sign of the calculated potential risk, RP, and modifies the contour of the right side portions 72*i* and 73*i* of the seat 71 when the sign of the potential risk, RP, is plus, but modifies the contour of the left side portions 72*j* and 73*j* of the seat 72 when the sign of the potential risk, RP, is minus. This makes it possible to impressively forward to the driver information regarding the lateral position $\delta$ and the heading angle $\theta$ via haptic inputs.

Second Exemplary Implementation of the Disclosure

According to the second exemplary implementation, the contour of a seat 71 is modified in response to a potential risk, RP, to forward information related to a positional relationship of a vehicle 100 within a lane to a driver occupying the seat 71 within the vehicle 100. When the vehicle 100 is traveling along a lane in the proximity of a lane boundary with a heading angle $\theta$ representing that the vehicle 100 is deviating from the lane, information regarding this heading angle $\theta$ is emphasized and forwarded to the driver. When the vehicle 100 is traveling along a curved lane with its lateral position $\delta$ representing that the vehicle 100 is thrown towards a curved outer lane boundary, the lateral position $\delta$ is emphasized and information thereof is forwarded to the driver. When the vehicle 100 is heading in a direction towards the curved outer lane boundary during traveling along the curved lane, the heading angle $\theta$ is more emphasized and information thereof is forwarded to the driver.

The manner of calculating the potential risk, RP, is described below.

Different from the first exemplary implementation, the second exemplary implementation uses maps to determine a first weight $k\delta$ for the lateral position $\delta$ and a second weight $k\theta$ for the heading angle $\theta$.

Figure 12:
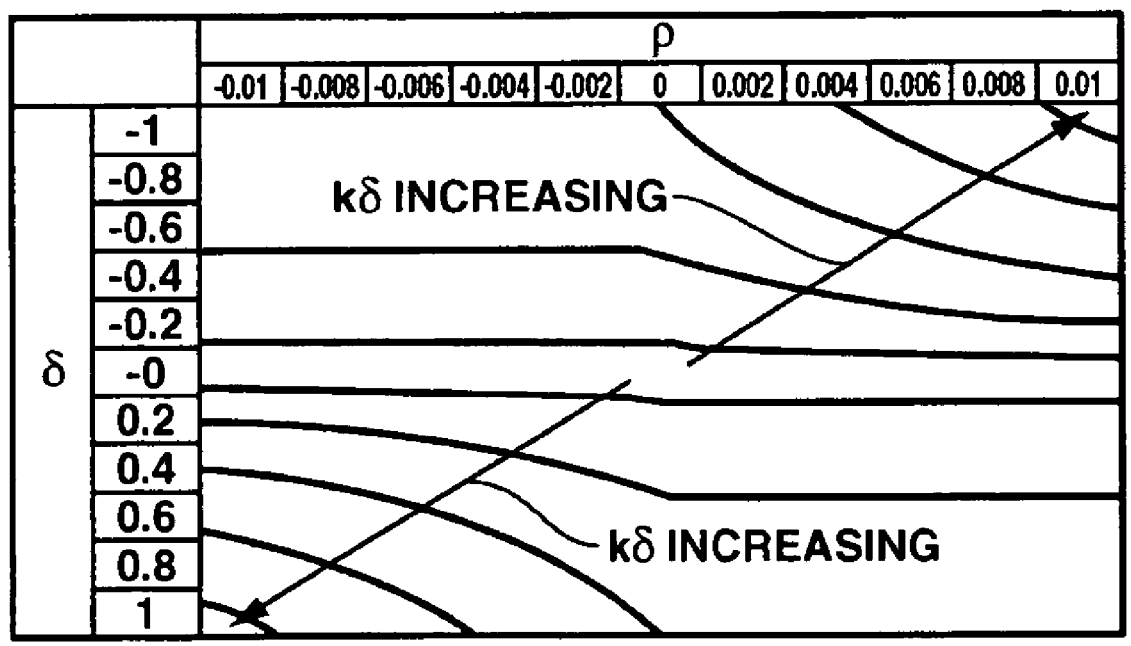
FIG. 12 illustrates varying values of a first weight kδ for a lateral position δ of a vehicle relative to different combinations of values of the lateral position δ and values of a lane curvature ρ.
Figure 13A:
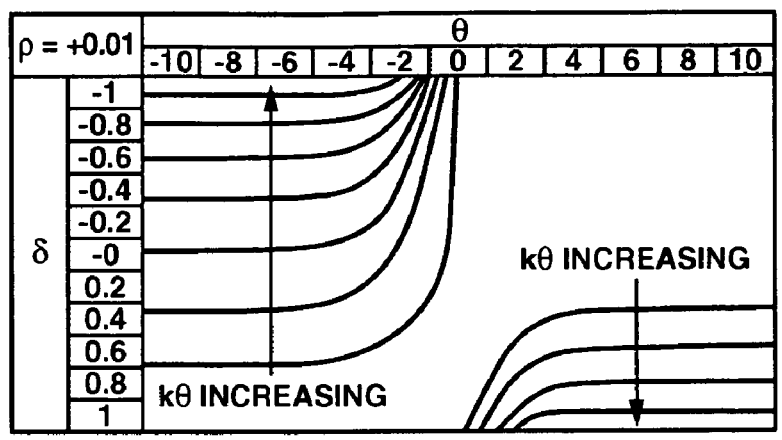
FIG. 13(a) illustrates varying mapped values of a second weight kθ for a heading angle θ of a vehicle relative to different combinations of values of a lateral position δ of the vehicle and values of the heading angle θ when the vehicle is traveling along a rightwards curved lane having a lane curvature ρ=+0.01.
Figure 13B:
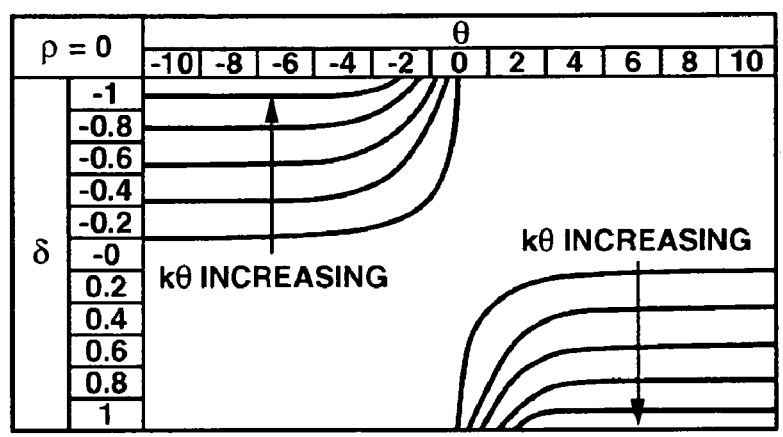
FIG. 13(b) illustrates varying mapped values of the second weight kθ relative to different combinations of values of the lateral position δ and values of the heading angle θ when the vehicle is traveling along a straight lane having a lane curvature ρ=0.
Figure 13C:
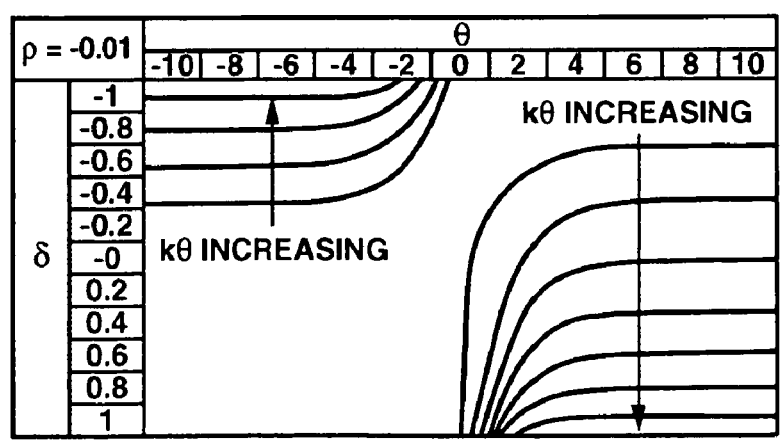
FIG. 13(c) illustrates varying mapped values of the second weight kθ relative to different combinations of values of the lateral position δ and values of the heading angle θ when the vehicle is traveling along a leftwards curved lane having a lane curvature ρ=−0.01.

FIG. 12 illustrates a map containing values of a first weight $k\delta$ for the lateral position $\delta$ versus different combinations of values of the lateral position $\delta$ and values of a lane curvature $\rho$. FIG. 13(a) illustrates a map containing values of a second weight $k\theta$ for the heading angle $\theta$ versus different combinations of values of the lateral position $\delta$ and values of the heading angle $\theta$ when the vehicle is traveling along a rightwards curved lane having a lane curvature $\rho=+0.01$. FIG. 13(b) illustrates a map containing values of the second weight $k\theta$ against different combinations of values of the lateral position $\delta$ and values of the heading angle $\theta$ when the vehicle 100 is traveling along a straight lane having a lane curvature $\rho=0$. FIG. 13(c) illustrates a map containing values of the second weight $k\theta$ versus different combinations of values of the lateral position $\delta$ and values of the heading angle $\theta$ when the vehicle is traveling along a leftwards curved lane having a lane curvature $\rho=-0.01$. In each of the maps, the fully drawn curves are isometric lines.

In the map shown in FIG. 12, when a lane is curved rightwards ($\rho>0$), the first weight $k\delta$ increases with varying lateral position $\delta$ in a direction towards a curved outer lane boundary on the left and with varying lane curvature $\rho$ in a direction of tightening the curvature of the lane. When a lane is curved leftwards ($\rho<0$), the first weight $k\delta$ increases with varying lateral position $\delta$ in a direction towards a curved outer lane boundary on the right, and with varying lane curvature $\rho$ in a direction of tightening the curvature of the lane. When a lane is straight ($\rho=0$), the first weight $k\delta$ increases with varying lateral position $\delta$ in a direction towards any of lane boundaries.

In the map shown in FIG. 13(a), when a lane is curved rightwards and the vehicle 100 is heading in a direction towards a curved outer lane boundary on the left ($\rho>0$, $\theta<0$), the second weight $k\theta$ increases with varying lateral position $\delta$ in a direction towards the curved outer lane boundary on the left, and with varying heading angle $\theta$ in a direction towards the curved outer lane boundary on the left. Even if the vehicle 100 is in the proximity of a curved inner lane boundary on the right, as long as the vehicle 100 is heading in a direction towards the curved outer lane boundary on the left, the second weight $k\theta$ increases with varying lateral position $\delta$ in a direction towards the curved outer lane boundary on the left. If the vehicle 100 is heading in a direction towards the curved inner lane boundary on the right ($\theta>0$), the second weight $k\theta$ increases with varying lateral position $\delta$ in a direction towards the curved inner lane boundary on the right. However, the second weight $k\theta$ increases at a lesser degree if the vehicle 100 is heading towards the curved inner lane boundary on the right than it does if the vehicle 100 is heading towards the curved outer lane boundary on the left.

In the map shown in FIG. 13(b), when the vehicle 100 is traveling along a straight lane ($\rho=0$), the second weight $k\theta$ increases with varying lateral position $\delta$ in a direction towards any of lane boundaries, and with varying heading angle $\theta$ in a direction of increasing deviation of the vehicle 100 from the lane. In the map shown in FIG. 13(c), when a lane is curved leftwards and the vehicle 100 is heading in a direction towards a curved outer lane boundary on the right ($\rho<0$, $\theta>0$), the second weight $k\theta$ increases with varying lateral position $\delta$ in a direction towards the curved outer lane boundary on the right, and with varying heading angle $\theta$ in a direction towards the curved outer lane boundary on the right. Even if the vehicle 100 is in the proximity of a curved inner lane boundary on the left, as long as the vehicle 100 is heading in a direction towards the curved outer lane boundary on the right, the second weight $k\theta$ increases with varying lateral position $\delta$ in a direction towards the curved outer lane boundary on the right. If the vehicle 100 is heading in a direction towards the curved inner lane boundary on the left ($\theta<0$), the second weight $k\theta$ increases with varying lateral position $\delta$ in a direction towards the curved inner lane boundary on the left. However, the second weight $k\theta$ increases at a lesser degree if the vehicle 100 is heading towards the curved inner lane boundary on the left than it does if the vehicle 100 is heading towards the curved outer lane boundary on the right.

Using the maps shown in FIGS. 13(a), 13(b) and 13(c), a value of the second weight $k\theta$ may be determined by interpolation techniques if the lane curvature $\rho$ falls between +0.01, 0, and −0.01.

Using the first and second weights $k\delta$ and $k\theta$, a potential risk, RP, is calculated. The potential risk, RP, may be expressed as;

$$RP = k\delta \cdot \delta + k\theta \cdot \sin\theta \quad (10)$$

Using the potential risk, RP, expressed by the equation (10), angular positions Sr and Sl of the side portions of a seat 71 are determined in the same manner as described before in connection with the first exemplary implementation.

In all possible states, amounts of a change in the potential risk, RP, against a unit change in the lateral position $\delta$ or a unit change in the heading angle $\theta$ are classified into three levels, a large level labeled "LARGE", a small level labeled "SMALL", and a middle level labeled "MIDDLE". The results of classification are tabulated in a table shown in FIG. 14.

With reference to FIG. 14, if a lane is straight ($\rho=0$), a change in the potential risk, RP, against a unit change in the lateral position $\delta$ falls in a middle level labeled "MIDDLE" regardless of the position within a lane.

If a heading angle $\theta$ represents a direction approaching a lane boundary during traveling along a straight lane ($\rho=0$), a change in the potential risk, RP, against a unit change in a heading angle $\theta$ falls in a small level labeled "SMALL" during traveling on or in the proximity of a determined lane centerline, but falls in the middle level "MIDDLE" during traveling in the proximity of a lane boundary or lane edge.

If the heading angle $\theta$ represents a direction away or separating from a lane boundary during traveling along a straight lane ($\rho=0$), a change in the potential risk, RP, against a unit change in the heading angle $\theta$ falls in a small level labeled "SMALL" regardless of the position within the lane.

If a lane is curved ($\rho\neq0$), a change in the potential risk, RP, against a unit change in the lateral position $\delta$ falls in the middle level labeled "MIDDLE" during traveling on or in the proximity of a determined lane centerline, in a large level labeled "LARGE" during traveling in the proximity of a curved outer lane boundary or outer lane edge, and in the middle level labeled "MIDDLE" during traveling in the proximity of a curved inner lane boundary or inner lane edge.

If the heading angle $\theta$ represents a direction towards a curved outer lane boundary during traveling along the curved lane ($\rho\neq0$), a change in the potential risk, RP, against a unit change in the heading angle $\theta$ falls in the middle level labeled "MIDDLE" during traveling on or in the proximity of a determined lane centerline, in the large level labeled "LARGE" during traveling in the proximity of the curved outer lane boundary or outer lane edge, and in the small level labeled "SMALL" during traveling in the proximity of the curved inner lane boundary or inner lane edge.

If the heading angle θ represents a direction towards a curved inner lane boundary during traveling along the curved lane (ρ≠0), a change in the potential risk, RP, against a unit change in the heading angle θ falls in the small level labeled "SMALL" during traveling on or in the proximity of a determined lane centerline, in the small level labeled "SMALL" during traveling in the proximity of the curved outer lane boundary or outer lane edge, and in the middle level labeled "MIDDLE" during traveling in the proximity of the curved inner lane boundary or inner lane edge.

In addition to the effects provided by the first exemplary implementation, the second exemplary implementation provides effects as follows:

(1) As readily seen from the maps of FIGS. 13(a) to 13(c), the second weight kθ increases with an increase in the magnitude of the lateral position |δ| or as the vehicle 100 approaches a lane boundary. This makes it possible to emphasize the heading angle θ in forwarding information to the driver via haptic inputs.

(2) As readily seen from the maps of FIGS. 13(a) to 13(c), if the heading angle θ represents that the vehicle 100 is heading in a direction deviating from a lane, the second weight kθ increases with an increase in the magnitude of the lateral position |δ| or as the vehicle 100 approaches a lane boundary. This makes it possible to emphasize the heading angle θ in forwarding information to the driver via haptic inputs.

(3) As readily seen from the maps of FIGS. 13(a) and 13(c), if a lane is curved, the second weight kθ is larger when the vehicle is heading in a direction towards a curved outer lane boundary than it is when the vehicle is heading in a direction towards a curved inner lane boundary. This makes it possible to emphasize the heading angle when the vehicle is heading in a direction towards the curved outer lane boundary in forwarding information to the driver via haptic inputs.

(4) As readily seen from the map of FIG. 12, if a lane is curved, the first weight kδ increases with the lateral position δ approaches a curved outer lane boundary. This makes it possible to emphasize the lateral position δ in forming information to the driver via haptic inputs when the vehicle approaches the curved outer lane boundary.

(5) As readily seen from the map of FIG. 12, if a lane is curved, the first weight kδ increases with an increase in lane curvature |ρ| the lateral position δ approaches a curved outer lane boundary. This makes it possible to emphasize the lateral position δ in forming information to the driver via haptic inputs when the vehicle approaches the curved outer lane boundary.

Third Exemplary Implementation of the Disclosure

Figure 15A:
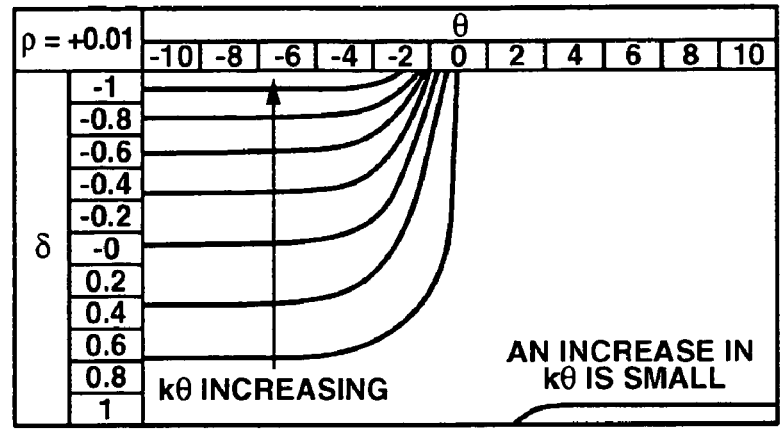
FIG. 15(a) illustrates a modified diagram of varying mapped values of a second weight kθ for a heading angle θ of a vehicle relative to different combinations of values of a lateral position δ of the vehicle and values of the heading angle θ when the vehicle is traveling along a rightwards curved lane having a lane curvature ρ=+0.01.
Figure 15B:
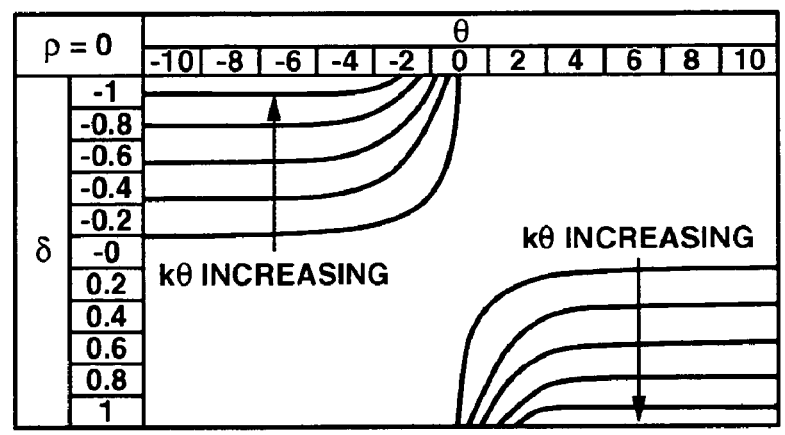
FIG. 15(b) illustrates varying mapped values of the second weight kθ relative to different combinations of values of the lateral position δ and values of the heading angle θ when the vehicle is traveling along a straight lane having a lane curvature ρ=0.
Figure 15C:
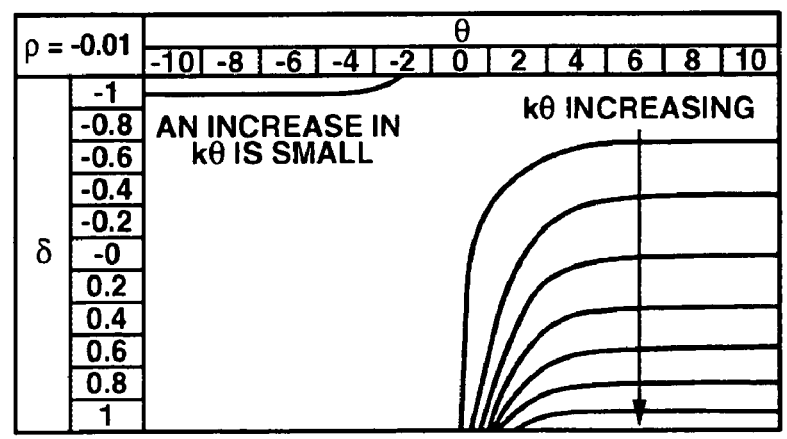
FIG. 15(c) illustrates a modified diagram of varying mapped values of the second weight kθ with different combinations of values of the lateral position δ and values of the heading angle θ when the vehicle is traveling along a leftwards curved lane having a lane curvature ρ=−0.01.

This third exemplary implementation is substantially the same as the second exemplary implementation. The first and second weight kδ and kθ are determined using maps. The map of FIG. 12 is used to determine the first weight kδ. However, new maps shown in FIGS. 15(a) to 15(c) are used to determine the second weight kθ. Using these maps, an increase in the second weight kθ may be suppressed when the vehicle is heading in a direction towards a curved inner lane boundary during travel along a curved lane.

As shown in FIGS. 15(a) to 15(c), a change in the second weight kθ when the vehicle is heading in a direction towards a curved outer lane boundary during traveling along a curved lane, and a change in the second weight kθ during traveling along a straight lane are the same as the second exemplary implementation. However, as shown in FIG. 15(a), an increase in the second weight kθ is small when the vehicle is heading in a direction towards a curved inner lane boundary on the right during traveling along a rightwards curved lane (ρ>0, θ>0). As shown in FIG. 15(c), an increase in the second weight kθ is small when the vehicle is heading in a direction towards a curved inner lane boundary on the left during traveling along a leftwards curved lane (ρ<0, θ<0).

In this manner, an increase in the second weight kθ is suppressed when the vehicle is heading in a direction towards a curved inner lane boundary. During negotiating with a curved lane by taking an out-in-out course, as the heading angle θ is less emphasized when the vehicle is heading in a direction towards a curved inner lane boundary. Thus, a vehicle driver can take a desired course in passing through the curved lane while receiving appropriate information regarding the lateral position δ via haptic inputs.

Fourth Exemplary Implementation of the Disclosure

The fourth exemplary implementation is substantially the same as the second exemplary implementation. However, the fourth exemplary implementation is different from the second exemplary implementation in that a vehicle speed V of a vehicle 100 is used in calculating a potential risk, RP. In the fourth exemplary implementation, the product $\rho \cdot V^2$ is used instead of the lane curvature ρ in retrieving the maps to determine the appropriate weights kδ and kθ. Besides, the determined weights kδ and kθ are corrected based the vehicle speed V.

The manner of calculating the potential risk, RP, is described below.

Similar to the second exemplary implementation, the fourth exemplary implementation uses maps to determine a first weight kδ for the lateral position δ and a second weight kθ for the heading angle θ.

FIGS. 16, 17(a), 17(b), and 17(c) illustrate maps used in the fourth exemplary implementation. FIGS. 16, 17(a), 17(b), and 17(c) are substantially the same as FIGS. 12, 13(a), 13(b), and 13(c) except that the product $\rho \cdot V^2$ is used instead of the lane curvature ρ.

Figure 16:
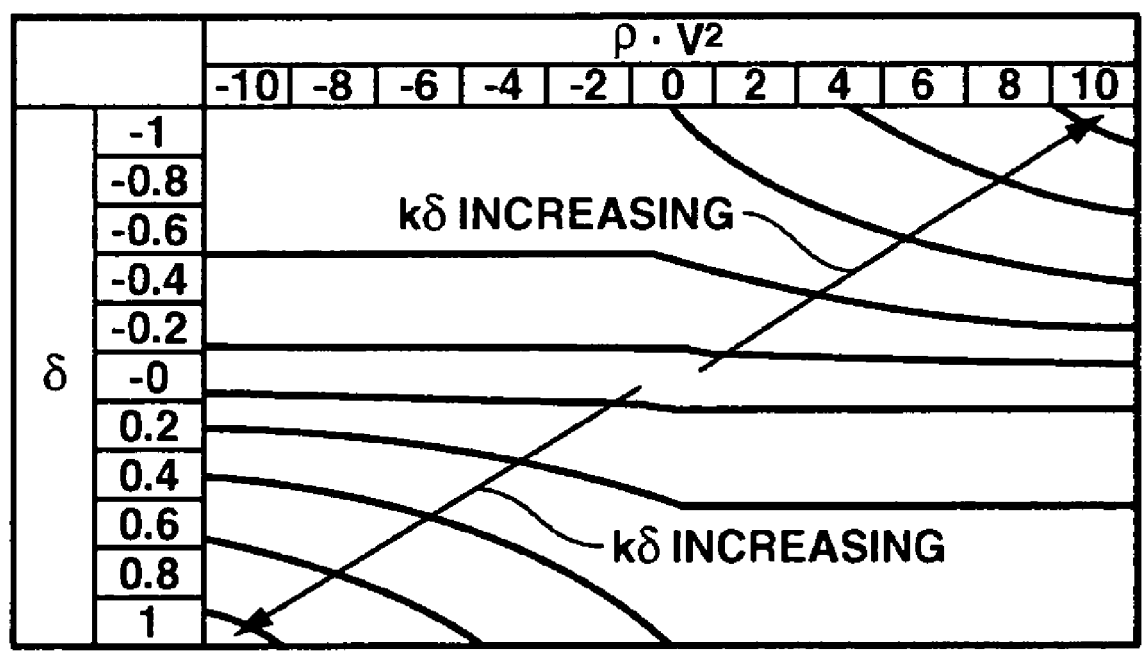
FIG. 16 illustrates varying mapped values of a first weight kδ for a lateral position δ of a vehicle relative to different combinations of values of the lateral position δ and values of a product $\rho \cdot V^2$.
Figure 17A:
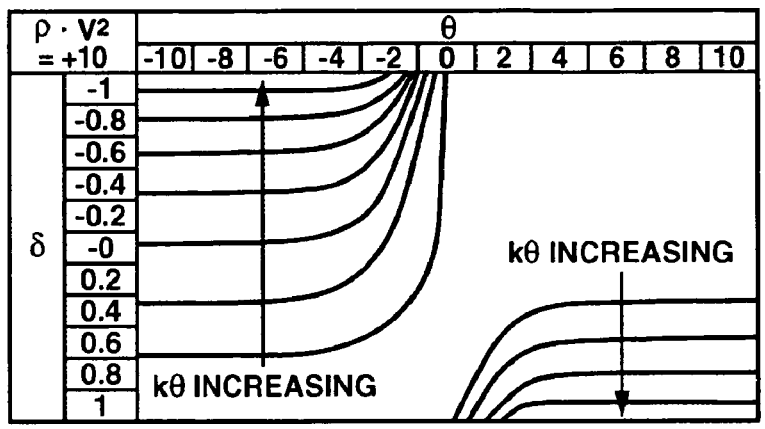
FIG. 17(a) illustrates varying mapped values of a second weight kθ for a heading angle θ of a vehicle relative to different combinations of values of a lateral position δ of the vehicle and values of the heading angle θ when the product $\rho \cdot V^2$=+10.

FIG. 16 illustrates a map containing values of the first weight kδ for the lateral position δ versus different combinations of values of the lateral position δ and values of the product $\rho \cdot V^2$. FIG. 17(a) illustrates a map containing values of the second weight kθ for the heading angle θ versus different combinations of values of the lateral position δ and values of the heading angle θ when the product $\rho \cdot V^2 = +10$. FIG. 13(b) illustrates a map containing values of the second weight kθ against different combinations of values of the lateral position δ and values of the heading angle θ when the product $\rho \cdot V^2 = 0$. FIG. 13(c) illustrates a map containing values of the second weight kθ versus different combinations of values of the lateral position δ and values of the heading angle θ when the product $\rho \cdot V^2 = -10$. In each of the maps, the fully drawn curves are isometric lines.

In the map of FIG. 16, the first weight kδ increases with an increase in the magnitude of lane curvature |ρ| and an increase in vehicle speed V and with varying lateral position δ in a direction towards a curved outer lane boundary.

In the map shown in FIG. 17(a), when a lane is curved rightwards and the vehicle 100 is heading in a direction towards a curved outer lane boundary on the left ($\rho \cdot V^2 > 0$, θ<0), the second weight kθ increases with varying lateral position δ in a direction towards the curved outer lane boundary on the left and with varying heading angle θ in a direction towards the curved outer lane boundary on the left. Even if the vehicle 100 is in the proximity of a curved inner lane boundary on the right, as long as the vehicle 100 is heading in a direction towards the curved outer lane boundary on the left, the second weight kθ increases with varying lateral position δ in a direction towards the curved outer lane boundary on the left. If the vehicle 100 is heading in a direction towards the curved inner lane boundary on the right (θ>0), the second weight kθ increases with varying in the lateral position δ in a direction towards the curved inner lane boundary on the right. However, the second weight kθ increases at a lesser degree if the vehicle 100 is heading towards the curved inner lane boundary on the right than it does if the vehicle 100 is heading towards the curved outer lane boundary on the left.

Figure 17B:
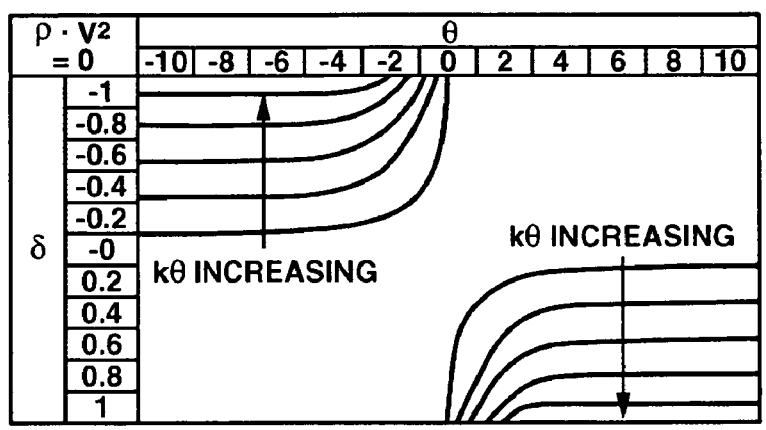
FIG. 17(b) illustrates varying mapped values of the second weight kθ with different combinations of values of the lateral position δ and values of the heading angle θ when the product $\rho \cdot V^2$=0.

In the map of FIG. 17(b), when the vehicle 100 is traveling along a straight lane (ρ·V²=0), the second weight kθ increases with varying lateral position δ in a direction towards each of lane boundaries and with varying heading angle θ in a direction of increasing deviation of the vehicle 100 from the lane.

Figure 17C:
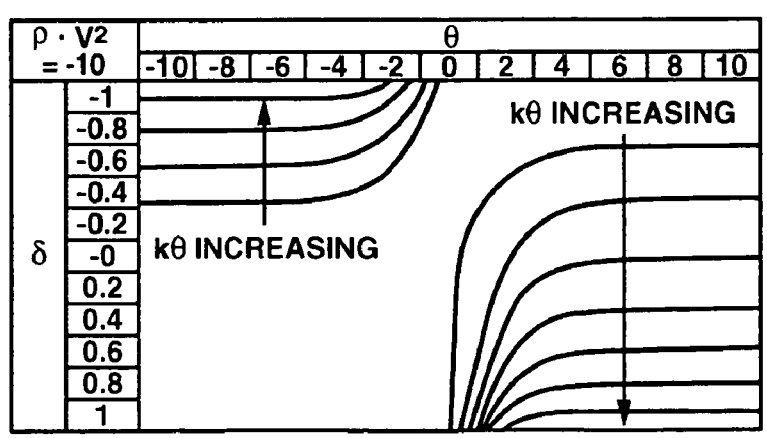
FIG. 17(c) illustrates varying mapped values of the second weight kθ with different combinations of values of the lateral position δ and values of the heading angle θ when the product $\rho \cdot V^2$=−10.

In the map of FIG. 17(c), when a lane is curved leftwards and the vehicle 100 is heading in a direction towards a curved outer lane boundary on the right (ρ·V²<0, θ>0), the second weight kθ increases with varying lateral position δ in a direction towards the curved outer lane boundary on the right and with varying heading angle θ in a direction towards the curved outer lane boundary on the right. Even if the vehicle 100 is in the proximity of a curved inner lane boundary on the left, as long as the vehicle 100 is heading in a direction towards the curved outer lane boundary on the right, the second weight kθ increases with varying lateral position δ in a direction towards the curved outer lane boundary on the right. If the vehicle 100 is heading in a direction towards the curved inner lane boundary on the left (θ<0), the second weight kθ increases with varying lateral position δ in a direction towards the curved inner lane boundary on the left. However, the second weight kθ increases at a lesser degree if the vehicle 100 is heading towards the curved inner lane boundary on the left than it does if the vehicle 100 is heading towards the curved outer lane boundary on the right.

Using the maps shown in FIGS. 17(a), 17(b) and 17(c), a value of the second weight kθ may be determined by interpolation techniques if the product ρ·V² falls between +10, 0, and −10.

Figure 18:
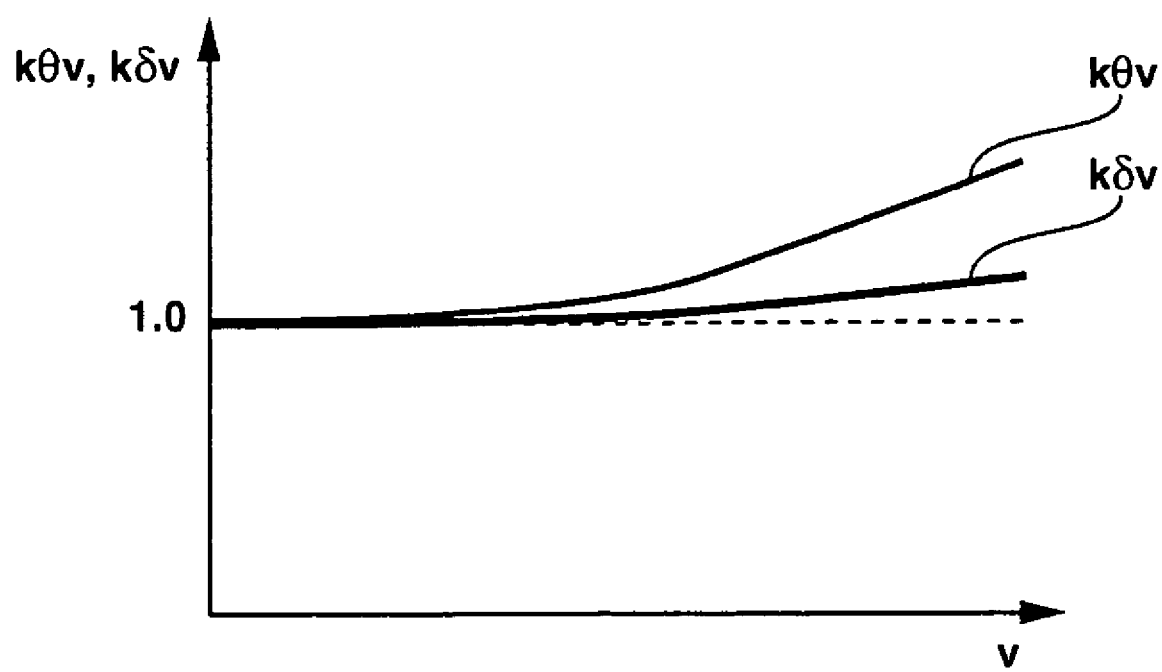
FIG. 18 illustrates correction coefficients relative to different values in vehicle speed.

As mentioned before, the first and second weights kδ and kθ are corrected using the vehicle speed V. Specifically, correction coefficients kδv and kθv are determined based on the vehicle speed V, and are multiplied with the first and second weights kδ and kθ, respectively. FIG. 18 illustrates an exemplary relationship of the correction coefficients kδv and kθv relative to different values of vehicle speed V. In the embodiment, the correction coefficients kδv and kθv are determined using the relationship shown in FIG. 18. As shown in FIG. 18, the correction coefficients kδv and kθv increase from 1 gradually as the vehicle speed V increases. With the same vehicle speed V, the correction coefficient kθv is greater than the other correction coefficient kδv (kθv≧kδv).

In the fourth exemplary implementation, a potential risk, RP, may be expressed as:

$$RP = k\delta v \cdot k\delta \cdot \delta + k\theta v \cdot k\theta \cdot \sin\theta \tag{11}$$

Using the potential risk, RP, expressed by the equation (11), angular positions Sr and Sl of the side portions of a seat 71 are determined in the same manner as described before in connection with the first exemplary implementation.

In addition to the effects provided by the first to third exemplary implementation, the fourth exemplary implementation provides the following effect:

As the potential risk expressed by the equation (11) incorporates the vehicle speed V, the heading angle θ is emphasized more than the lateral position δ is depending upon the vehicle speed V if, during traveling along a curved lane, the vehicle is heading towards the curved outer lane boundary.

Fifth Exemplary Implementation of the Disclosure

The fifth exemplary implementation is substantially the same as the first exemplary implementation and uses a potential risk, RP, expressed by the equation (7). However, the fifth exemplary implementation is different from the first exemplary implementation in that the first and second weights kδ and kθ, expressed by the equations (3), (4), (5) and (6), are now expressed as follows:

If δ·ρ<0, then $$k\delta(\delta, \rho) = k1 \cdot (1 + a1 \cdot |\rho \cdot V^2|) \tag{12}$$

If δ·ρ≧0, then $$k\delta(\delta, \rho) = k1 \tag{13}$$

If δ·θ≧0, then $$k\theta(\delta, \theta, \rho) = k21 \cdot (1 + a2 \cdot |\rho \cdot V^2|) \cdot |\delta| \tag{14}$$

If δ·θ<0, then $$k\theta(\delta, \theta, \rho) = k22 \cdot (1 + a2 \cdot |\rho \cdot V^2|) \cdot |\delta| \tag{15}$$

where: k22≦k21.

Using the potential risk, RP, expressed by equation (7), angular positions Sr and Sl of the side portions of a seat 71 are determined in the same manner as described before in connection with the first exemplary implementation.

In addition to the effects provided by the first exemplary implementation, the fifth exemplary implementation has the following effect:

The potential risk expressed by the equation (7) incorporates the first and second weights kδ and kθ determined depending on the vehicle speed V. Thus, if, during traveling along a curved lane, the vehicle is heading towards the curved outer lane boundary, this information is emphasized and forwarded to the driver.

Sixth Exemplary Implementation of the Disclosure

The sixth exemplary implementation is substantially the same as the second exemplary implementation in that both use a potential risk, RP, as expressed in equation (10) after determining the first and second weights (or gains) kδ and kθ using maps. However, the sixth exemplary implementation is different from the second exemplary implementation in that the first and second weights kδ and kθ are gradually changed upon determining that there will be a change in lane curvature along the path ahead of a vehicle 100.

Figure 19:
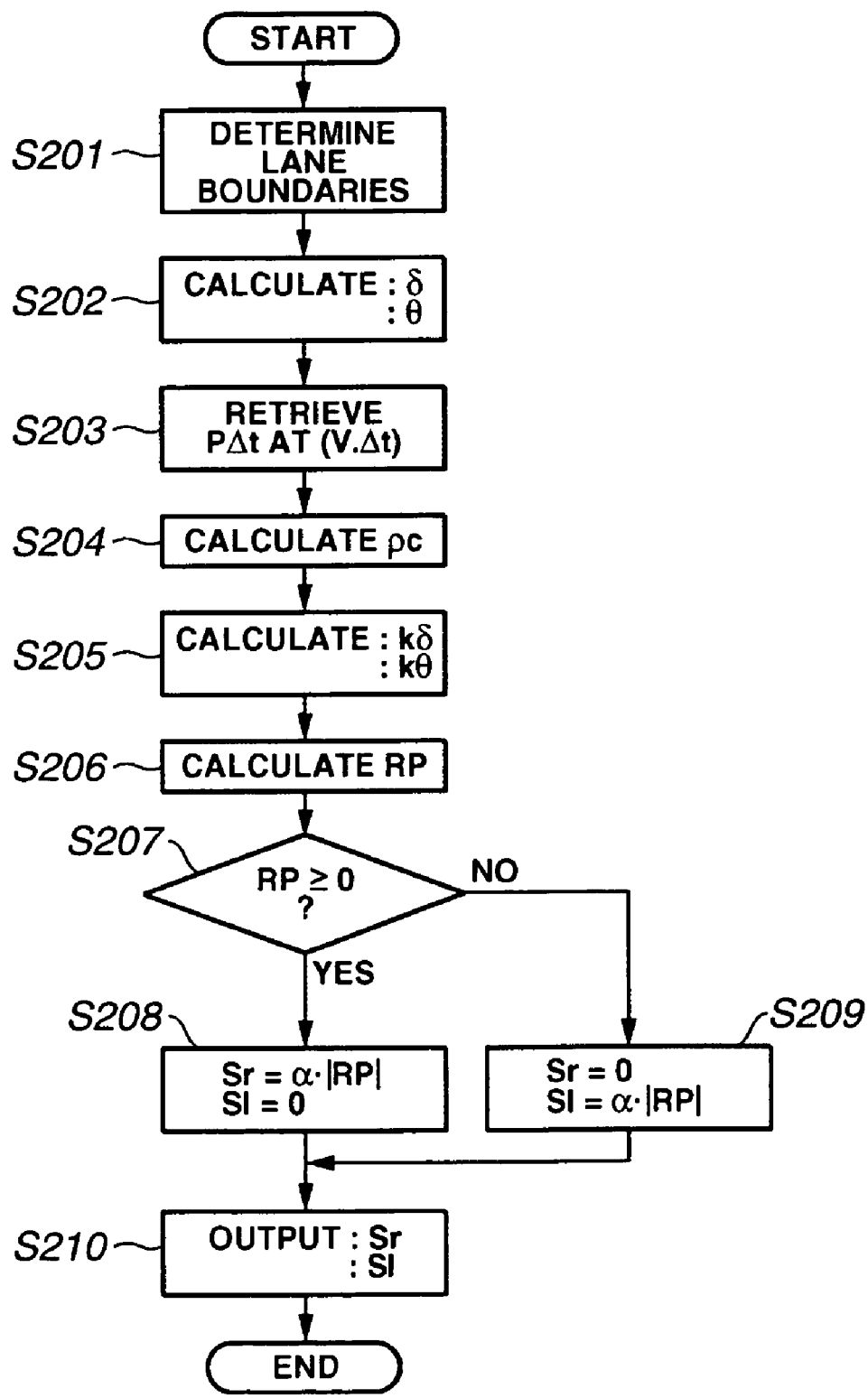
FIG. 19 is a flow chart of a control routine.

The sixth exemplary implementation is best understood from the following description along the flow chart illustrated in FIG. 19. The flow chart in FIG. 19 illustrates a control routine stored in a computer readable storage medium executed by a controller. Execution of this control routine is repeated at an interval of 50 milliseconds.

In FIG. 19, at step S201, lane boundaries of a lane are determined by processing images picked up by the front camera 20 to detect lane markings on a road ahead of the vehicle 100.

At step S202, a lateral position δ, a heading angle θ, and a lane curvature ρ are calculated as variables representing a positional relationship of the vehicle 100 within the lane. The manner of calculating the variables is the same as that described before with reference to FIGS. 10 and 11. It should be noted that steps S201 and S202 are identical to steps S101 and S102 of the flow chart in FIG. 9.

At step S203, using information from the navigation system of the sensor system 10 (see FIG. 1), a lane curvature, ρΔt, in the path a distance (V·Δt) ahead of the vehicle 100 is retrieved. The distance is the product of V (vehicle speed) and Δt (predetermined time).

At step S204, using the lane curvature, ρΔt, a ramp value of lane curvature ρc is determined by calculating the following equation:

$$\rho c \leftarrow \rho c\_z + a \cdot (\rho \Delta t - \rho c\_z) \quad (16)$$

where: ρc_z represents the ramp value calculated in the last cycle; a is a constant.

At the next step S205, the first weight kδ and second weight kθ are determined by retrieving the map of FIG. 12 and the maps of FIGS. 13(a), 13(b) and 13(c) are retrieved using the ramp value ρc instead of the lane curvature ρ.

At step S206, using the first and second weights kδ and kθ, the potential risk, RP, as expressed by the equation (10) is calculated.

The control routine proceeds from step S206 to interrogation step S207. At step S207, it is determined whether or not the potential risk, RP, is greater than or equal to 0 (zero). If the potential risk, RP, is greater than or equal to zero (RP≧0), the control routine proceeds to step S208. If the potential risk, RP, is less than zero (RP<0), the control routine proceeds to step S209.

At step S208 or S209, an angular position of right side portions 72i and 73i from their rest positions, Sr, and an angular position of left side portions 72j and 73j from their rest positions, Sl, are determined.

If the potential risk, RP, is greater than or equal to zero (RP≧0), at step S208, the angular position Sl is set equal to 0 (Sl=0) and the angular position Sr is given as Sr=α·|RP|, where: α is a constant.

If the potential risk, RP, is less than zero (RP<0), at step S209, the angular position Sr is set equal to 0 (Sr=0) and the angular position Sl is given as Sl=α·|RP|, where: α is a constant.

At step S210, the angular positions Sr and Sl are provided, as output signals 66s (see FIG. 1), to the actuator assembly 70 coupled to the seat 71 to forward the potential risk, RP, to the driver.

Figure 20:
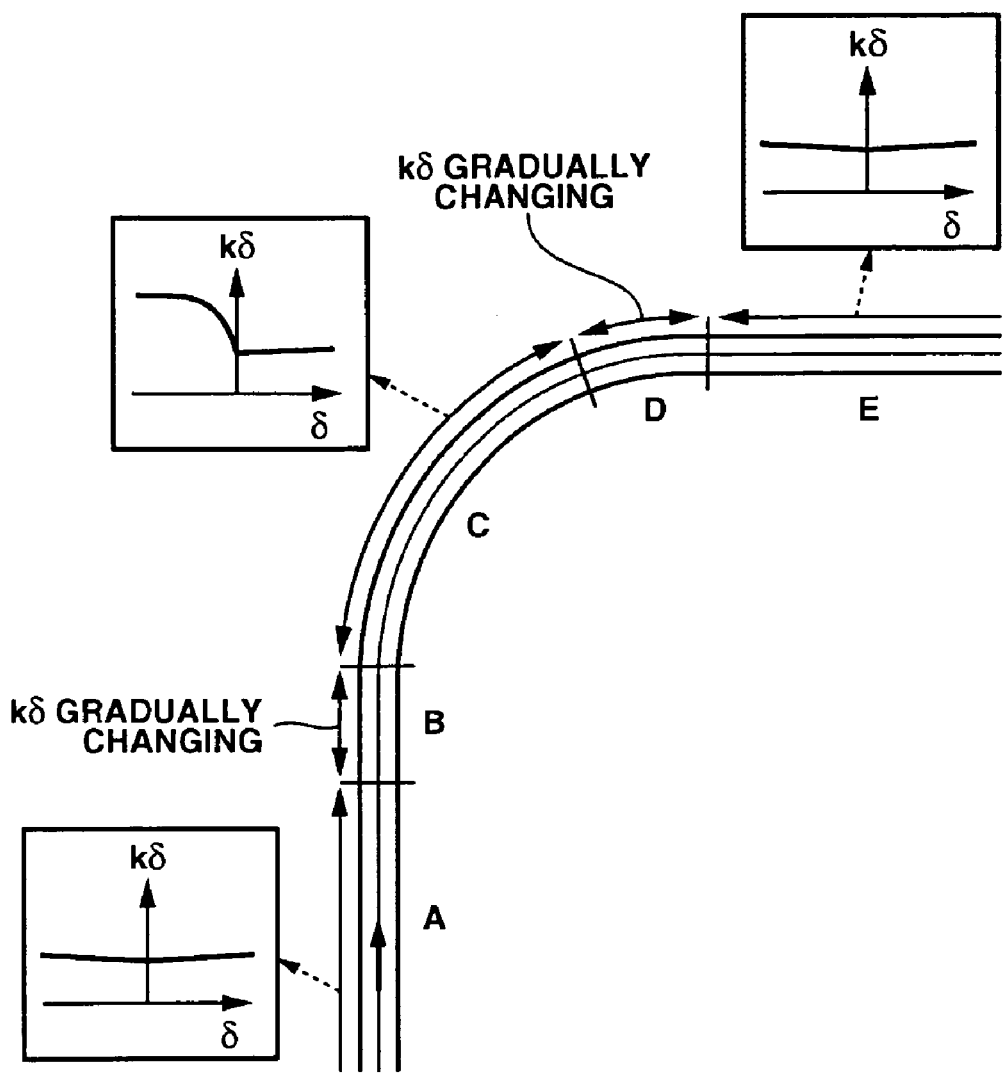
FIG. 20 is a state diagram of a vehicle traveling along a curved lane on a road.

With reference now to FIG. 20, the operation is described.

Figure 21:
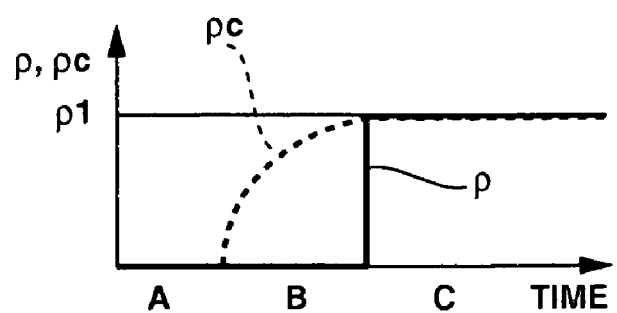
FIG. 21 illustrates actual lane curvature relative to time and varying calculated ramp value changing with time.

FIG. 20 is a state diagram illustrating changes of first weight kδ, which may be called "a lateral gain", before and after a curved lane. The lane curvature ρ is 0 (zero) along a straight lane (regions A and B) before the curved lane and along a straight lane (region E). The lane curvature ρ is a predetermined value ρ1 along the curved lane (regions C and D). Thus, as shown in FIG. 21, the actual lane curvature abruptly changes from zero to the predetermined value ρ1. But, the ramp value ρc gradually changes from zero to the predetermined value ρ1 before entering the curved lane (region B), and gradually changes back to zero after leaving the curved lane (region D).

The map of FIG. 12, which may be called "kδ map", contains values of the first weight kδ depending upon the lateral position δ and lane curvature ρ. The ramp value ρc is used instead of the lane curvature. The ramp value ρc is equal to the lane curvature ρ as illustrated in FIG. 21 over regions A and C. Thus, the relationship between the first weight kδ and the lateral position δ may be defined as illustrated in characteristic curves in FIG. 20. However, this relationship gradually changes over the region because the ramp value ρc gradually changes. Thus, the first weight (lateral gain) kδ gradually changes over the region B. Over the range D, the first weight (lateral gain) kδ gradually changes from the value of the weight kδ over the region C to the value of the weight kδ over the region E.

The second weight (angular gain) kθ will gradually changes over the regions B and D.

In addition to the effects provided by the before described implementations, this sixth exemplary implementation provide the following effect.

Upon determining that there will be a change in lane curvature in the path ahead of the vehicle 100, the first and second weights kδ and kθ gradually increase from their values for a value of lane curvature before the change to their values for a value of lane curvature after the change from a point a predetermined distance (V·Δt) before a point the change in lane curvature will take place. Thus, the potential risk, RP, gradually increases well before entering a curved lane to forward the driver information regarding the curved lane in the path ahead of the vehicle. After leaving the curved lane, the weights gradually drop. Thus, the potential risk, RP, gradually drop, thus relieving the driver from the strain of negotiating the curved lane.

The predetermined distance (V·Δt) may be replaced with a predetermined time Δt.

In the preceding description, the side portions 72i, 73i and 72j, 73j of the seat 71 are all rotated inwardly to apply pressure to the driver. The system and method of the present disclosure are not limited to the illustrated example of rotating the side portions of the seat. This is just one of various examples. Another example is rotating the side portion 72i and 72j of the cushion portion 72 or the side portions 73i and 73j of the back rest 73. Further example is to rotate the side portions 72i and 72j of the cushion portion 72 if the potential risk, RP, is low, and rotate all of the side portions 72i, 73i, 72j and 73j if the potential risk, RP, is high.

The illustrated actuator assembly 70 is one of various examples. For example, an air bag may be used to modify contour of the seat 71. In this case, pressure within the air bag is regulated in accordance with the potential risk, RP.

Although the concepts and embodiments of this disclosure have been shown and described with respect to the exemplary implementations, it is obvious that equivalent alterations and modifications will occur to those skilled in the art upon reading and understanding of the specification. The present disclosure includes all such equivalent alterations and modifications, and is limited only by the scope of the claims.

What is claimed is:

1. A system for providing driving condition information to a driver of a vehicle occupying a driver seat, the system comprising:
   a sensor configured to detect a lateral position of the vehicle and a heading angle of the vehicle; and
   a haptic signal generator configured to generate a haptic signal from the seat based on the lateral position and the heading angle of the vehicle.

2. The system of claim 1, wherein the haptic signal generator is configured to perform the steps of:
determining a first weight for the lateral position and a second weight for the heading angle;
calculating a potential risk based on the first weight, the second weight, the lateral position signal and the heading angle signal; and
generating the haptic signal based on the calculated potential risk.

3. The system of claim 2, wherein:
the sensor is configured to further detect a lane curvature signal that indicates a curvature of a lane on which the vehicle is being driven; and
the haptic signal generator determines the first weight and the second weight based on the lateral position, the heading angle and the lane curvature.

4. The system of claim 3, wherein responsive to the lane curvature signal representing that the lane is curved, the second weight corresponding to a vehicle traveling towards an outer boundary of the lane and away from a determined centerline of the lane has a greater value than the second weight corresponding to a vehicle traveling away from the outer lane boundary and towards the determined centerline of the lane.

5. The system of claim 3, wherein responsive to the lane curvature signal representing that the lane is curved, the first weight increases as the vehicle approaches an outer boundary of the lane.

6. The system of claim 3, wherein responsive to the lane curvature signal representing that the lane is curved, the first weight increases as the curvature of the lane increases.

7. The system of claim 3, wherein the first weight and the second weight change with the curvature of the lane.

8. The system of claim 2, wherein the second weight increases as the vehicle approaches a lane boundary of a lane on which the vehicle is being driven.

9. The system of claim 2, wherein responsive to the heading angle representing that the vehicle deviates from a determined centerline of a lane on which the vehicle is being driven, the second weight increases as the vehicle approaches a lane boundary of the lane.

10. The system of claim 2, wherein:
the sensor is further configured to detect a vehicle speed and a lane curvature signal that indicates a curvature of a lane on which the vehicle is being driven; and
the haptic signal generator determines the first weigh: and the second weight based on the lateral position, the heading angle, the lane curvature, and the vehicle speed.

11. The system of claim 2, wherein:
the haptic signal includes a first haptic signal and a second haptic signal; and
the haptic signal generator is configured to apply a first haptic signal to the driver from a first portion of the seat in response to the potential risk having a positive value, and to apply the second haptic signal to the driver from a second portion of the seat in response to the potential risk having a negative value.

12. A vehicle comprising:
a seat configured to be occupied by a driver operating the vehicle;
a sensor configured to detect a lateral position of the vehicle and a heading angle of the vehicle; and
a haptic signal generator configured to generate a haptic signal from the seat based on the lateral position and the heading angle of the vehicle.

13. A method for providing driving condition information to a driver of a vehicle occupying a driver seat, the method comprising the steps of:
detecting a lateral position of the vehicle and a heading angle of the vehicle; and
generating a haptic signal from the seat based on the lateral position of the vehicle and the heading angle of the vehicle.

14. The method of claim 13, wherein the generating step modifies a contour of the seat based on the lateral position and the heading angle of the vehicle.

15. The method as claimed in claim 13, wherein:
the detecting step further detects a lane curvature signal that indicates a curvature of a lane on which the vehicle is being driven; and
the generating step includes the steps of:
determining a first weight for the lateral position and a second weight for the heading angle; and
calculating a potential risk based on the first weight, the second weight, the lateral position and the heading angle.

16. The method as claimed in claim 15, wherein the first weight increases as the vehicle approaches a lane boundary of the lane.

17. The method as claimed in claim 15, wherein responsive to the heading angle representing that the vehicle deviates from a determine centerline line of the lane, the second weight increases as the vehicle approaches a lane boundary of the lane.

18. The method as claimed in claim 15, wherein responsive the curvature representing that the lane is curved, the second weight corresponding to the vehicle traveling towards an outer boundary of the lane and away from a determined centerline of the lane has a greater value than the second weight corresponding to the vehicle traveling away from the outer lane boundary and towards the determined centerline of the lane.

19. The method as claimed in claim 15, wherein responsive to the lane curvature signal representing that the lane is curved, the first weight increases as the vehicle approaches an outer boundary of the lane.

20. The method as claimed in claim 15, wherein the first weight and the second weight change with the curvature of the lane.

21. A system for providing driving condition information to a driver of a vehicle occupying a driver seat, the system comprising:
means for detecting a lateral position of the vehicle and a heading angle of the vehicle; and
means for generating a haptic signal from the seat based on the lateral position and the heading angle of the vehicle.

22. A system for providing driving condition information to a driver occupying a driver seat of a motor vehicle running along a lane on a road, the system comprising:
a sensor configured to detect a lateral position of the vehicle within the lane in terms of a deviation from a conceived centerline of the lane;
a sensor configured to detect a heading angle of the vehicle within the lane with respect to the conceived centerline of the lane; and
a haptic signal generator configured to generate a haptic signal from the driver's seat based on the detected lateral position of the vehicle and the detected heading angle of the vehicle such that, via the haptic signal, the detected lateral position and heading angle are transmitted to the driver.

23. In combination with a motor vehicle running along a lane on a road, the motor vehicle being operated by a driver occupying a driver's seat, a system for providing driving condition information to the driver, comprising:

a sensor configured to detect a lateral position of the vehicle within the lane in terms of a deviation from a conceived centerline of the lane;

a sensor configured to detect a heading angle of the vehicle within the lane with respect to the conceived centerline of the lane; and a haptic signal generator configured to generate a haptic signal from the driver's seat so as to transmit the detected lateral position of the vehicle and the detected heading angle of the vehicle to the driver via the generated haptic signal from the driver's seat.

* * * * *